US012809883B2

(12) United States Patent
Banerjee et al.

(10) Patent No.: US 12,809,883 B2
(45) Date of Patent: Nov. 24, 2026

(54) METADATA GENERATION AND EVALUATION FOR DYNAMIC, AUTOMATED DATA TRANSFORMATION VALIDATION AND SYSTEMS AND METHODS OF THE SAME

(71) Applicant: T-Mobile USA, Inc., Bellevue, WA (US)

(72) Inventors: Arin Banerjee, Kent, WA (US); Prasad Vasantrao Changole, Issaquah, WA (US); Chaitanya Talavata Laxminarayana, Round Rock, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/807,869

(22) Filed: Aug. 16, 2024

(65) Prior Publication Data

US 2026/0050607 A1 Feb. 19, 2026

(51) Int. Cl.

*G06F 16/25* (2019.01)
*G06F 16/21* (2019.01)
*G06F 16/23* (2019.01)

(52) U.S. Cl.

CPC .......... *G06F 16/258* (2019.01); *G06F 16/213* (2019.01); *G06F 16/2365* (2019.01)

(58) Field of Classification Search

CPC .. G06F 16/258; G06F 16/213; G06F 16/2365; G06F 16/21

See application file for complete search history.

(56) References Cited

U.S. PATENT DOCUMENTS

| | | | |
|---|---|---|---|
| 7,478,365 B2 | 1/2009 | West et al. |
| 7,676,786 B2 | 3/2010 | Shenfield et al. |
| 8,448,130 B1 | 5/2013 | Pillarisetti et al. |
| 8,694,964 B1 | 4/2014 | Picard |
| 9,734,214 B2 | 8/2017 | Leizerovich et al. |
| 9,755,835 B2 | 9/2017 | Schneider et al. |
| 9,846,571 B1 | 12/2017 | Venkataramani et al. |
| 9,934,129 B1 | 4/2018 | Budurean et al. |

(Continued)

FOREIGN PATENT DOCUMENTS

| | | |
|---|---|---|
| KR | 102419956 B1 | 7/2022 |
| WO | 2014132250 A1 | 9/2014 |

(Continued)

*Primary Examiner* — Amy Ng
*Assistant Examiner* — Dustin D Eyers
(74) *Attorney, Agent, or Firm* — Ashurst Perkins Coie US LLP

(57) ABSTRACT

The disclosed process validation platform enables generation of metadata associated with data validation tests. For example, the process validation platform can retrieve a dataset associated with a data transformation pipeline and validate the quality of the dataset. Based on such validation, the process validation platform can generate a metadata schema and associated metadata structure (e.g., using a metadata generation model). The process validation platform can store the metadata structure in a cloud storage database and generate the metadata structure on a graphical user interface associated with a user to enable user interaction and modification of the generated metadata structure prior to the generation of associated code samples for data validation processes.

20 Claims, 12 Drawing Sheets

(56) References Cited

U.S. PATENT DOCUMENTS

| | | | |
|---|---|---|---|
| 9,952,915 | B2 | 4/2018 | Nano et al. |
| 10,086,286 | B2 | 10/2018 | Harvey et al. |
| 10,437,847 | B1 | 10/2019 | Silberstein et al. |
| 10,540,606 | B2 | 1/2020 | Dirac et al. |
| 11,086,827 | B1 | 8/2021 | Sainanee et al. |
| 11,392,578 | B1 | 7/2022 | James et al. |
| 11,475,036 | B1 * | 10/2022 | Joseph .................. G06F 16/258 |
| 11,776,578 | B2 * | 10/2023 | Morton ................ G11B 27/036 386/240 |
| 2014/0081903 | A1 | 3/2014 | Koosel et al. |
| 2020/0104236 | A1 * | 4/2020 | Creel .................. G06F 16/2365 |
| 2021/0200717 | A1 | 7/2021 | Aleksandrovich et al. |
| 2021/0200744 | A1 * | 7/2021 | Gubba .................. G06F 16/258 |
| 2021/0382908 | A1 | 12/2021 | Mupparapu |
| 2022/0129789 | A1 | 4/2022 | Zhang et al. |
| 2022/0237633 | A1 | 7/2022 | Locklear |
| 2023/0081067 | A1 * | 3/2023 | Mittal ................... G06F 16/258 707/602 |
| 2023/0244552 | A1 * | 8/2023 | Dewhare ............. G06F 9/44521 719/328 |
| 2023/0350662 | A1 | 11/2023 | Gonzalez et al. |
| 2024/0020531 | A1 | 1/2024 | Scepanski et al. |
| 2024/0070487 | A1 | 2/2024 | Merrill et al. |

FOREIGN PATENT DOCUMENTS

| | | | |
|---|---|---|---|
| WO | 2015143416 | A1 | 9/2015 |
| WO | 2020170217 | A1 | 8/2020 |

* cited by examiner

METADATA GENERATION AND EVALUATION FOR DYNAMIC, AUTOMATED DATA TRANSFORMATION VALIDATION AND SYSTEMS AND METHODS OF THE SAME

CROSS-REFERENCE TO RELATED APPLICATIONS

This application incorporates by reference U.S. application Ser. No. 18/807,860 SIMULATION-BASED filed Aug. 16, 2024, entitled AUTOMATED DATA TRANSFORMATION VALIDATION AND SYSTEMS AND METHODS OF THE SAME, U.S. application Ser. No. 18/807,879, filed Aug. 16, 2024, entitled AUTOMATED, DYNAMIC GENERATION OF EXECUTABLE CODE SAMPLES FOR DATA PIPELINE VALIDATION AND SYSTEMS AND METHODS OF THE SAME, and U.S. application Ser. No. 18/807,886, filed Aug. 16, 2024, entitled DYNAMIC, AUTOMATED EVALUATION OF CODE SAMPLES ASSOCIATED WITH DATA PIPELINE VALIDATION AND SYSTEMS AND METHODS OF THE SAME.

BACKGROUND

In computing, data validation or input validation is the process of ensuring data has undergone data cleansing to confirm they have data quality, that is, that they are both correct and useful. It uses routines, often called "validation rules", "validation constraints", or "check routines", that check for correctness, meaningfulness, and security of data that are input to the system. The rules may be implemented through the automated facilities of a data dictionary, or by the inclusion of explicit application program validation logic of the computer and its application.

Data validation is intended to provide certain well-defined guarantees for fitness and consistency of data in an application or automated system. Data validation rules can be defined and designed using various methodologies, and be deployed in various contexts. Their implementation can use declarative data integrity rules, or procedure-based rules (e.g., associated with hardware or software-related technical constraints).

The guarantees of data validation do not necessarily include accuracy, and it is possible for data entry errors such as misspellings to be accepted as valid. Other clerical and/or computer controls may be applied to reduce inaccuracy within a system.

BRIEF DESCRIPTION OF THE DRAWINGS

Detailed descriptions of implementations of the present invention will be described and explained through the use of the accompanying drawings.

Figure 1:
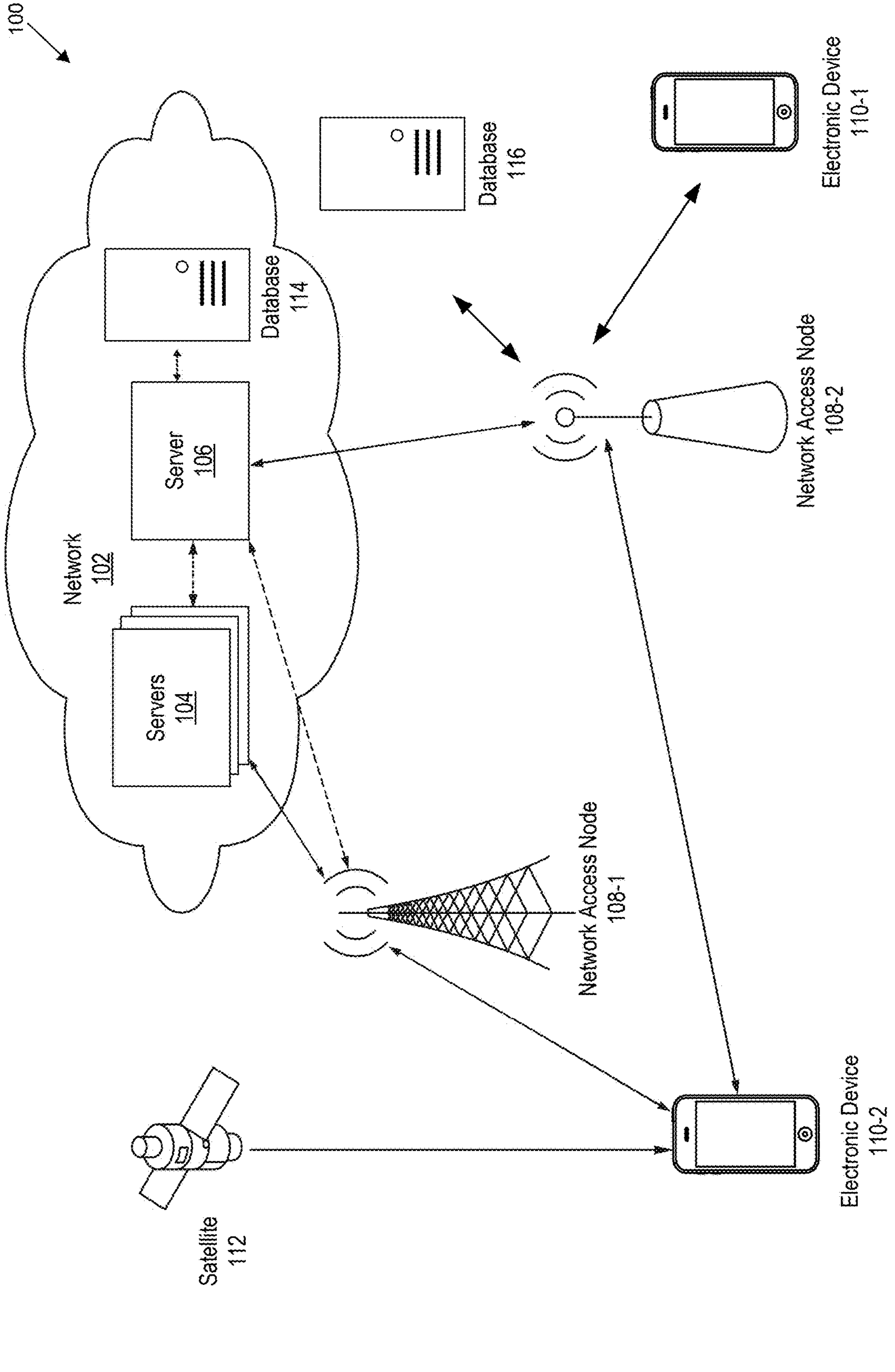
FIG. 1 is a block diagram illustrating an environment associated with the process validation platform disclosed herein.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Pre-existing systems can leverage data transformation pipelines to transform, modify, and/or distribute data in a modular manner. For example, a data transformation pipeline enables data transfer and modification across various nodes, processes, or modules, where the dataset can be processed in stages (e.g., where each stage is associated with a different device or entity). Such data transformation pipelines can power software development frameworks and complex software-related processes by providing flexible control over data transmission and transformation. While such data transformation pipelines offer powerful data analysis and processing capabilities, validation of such pipelines and the resulting data transformations remains challenging, due to the modular and variable nature of such pipelines.

In such pre-existing systems, data validation tasks are often performed in a manual and decentralized manner. For example, a pre-existing data transformation pipeline can validate data at each node or process using a node-specific data validation procedure. In some cases, such data validation methods are manual, requiring independent evaluation of data associated with the data transformation pipeline. Typically, a human reviewer evaluates and addresses discrepancies in data associated with the data pipeline (e.g., before and after a given process associated with a software development pipeline). Such manual review and validation of data can be inefficient and suffers from scalability. Furthermore, in data pipelines exhibiting complex relationships between transformed and untransformed data (e.g., input and output data), manual or rule-based validation techniques can fail to account for dependencies, links, or correlations between data at different stages of the data transformation pipeline, as such dependencies can be dynamic and complex. As such, pre-existing data validation systems do not effectively enable data validation in a scalable, dynamic, and adaptable fashion.

Data transformation pipelines can leverage modularity and complexity to power sophisticated computational workflows, by enabling the processing and transformation of data from various sources and at various nodes or processes. However, the flexibility of such pre-existing data transformation pipelines renders data validation difficult due to the presence of inconsistencies in data formats, schemas, or protocols. As such, as the complexity of data transformation pipelines (e.g., software development processes) increases, so does the difficulty of implementing manual or rule-based data validation techniques. Pre-existing manual or rule-based data validation systems fail to address data validation where there are discrepancies, inconsistencies, or variances in data formats or associated metadata.

Automated validation of data transformation pipelines can improve the efficiency of data evaluation by enabling dynamic evaluation of transformed data without human input using pre-determined rules. However, such rule-based data evaluation techniques can fail to capture dynamic conditions or changes in relationships or flows associated with the pipeline. Furthermore, such rule-based validation techniques preclude effective or timely intervention mechanisms (e.g., by a user). For example, automated validation techniques do not enable user modification or intervention in the data validation process. As such, rule-based automation of data evaluation and quality control can struggle to confer sufficient control over the validation processes, rules, and techniques to users, developers, or other suitable entities. Similarly, pre-existing data transformation pipelines lack evaluation and correction of data validation techniques themselves. For example, where a data validation test or rule fails to detect and correct an error, pre-existing validation techniques cannot learn from such failures due to the lack of evaluation of the validation algorithms themselves. Moreover, data transformation pipelines can incorporate sensitive data, such as personal identifiable information (PII), health-related information, or other information for which regulations, policies, or guidelines prevent disclosure to and/or processing with particular entities. Such data validation systems in pre-existing pipelines are not allowed to evaluate some datasets associated with the pipeline, thereby limiting the ability of the data transformation pipeline to evaluate and address discrepancies in data processing.

The process validation platform disclosed herein enables the validation, evaluation, and control of data transformation pipelines in a user-controlled, dynamic, and automated manner. For example, the process validation platform generates and validates test data to generate code samples that effectuate validation of data transformation pipelines (e.g., software development flows) in a manner that enables user feedback, control, and monitoring. To illustrate, the disclosed process validation platform can retrieve metadata that characterizes datasets associated with a particular data transformation pipeline. The platform can validate the metadata to ensure its consistency and accuracy by providing an associated metadata structure to a metadata validation model to generate a validation indicator. Based on validating the retrieved metadata, the process validation platform can provide the metadata structure to a data generation model that enables real-time generation of simulated data that is consistent with any formats, requirements, or guidelines specified within the associated metadata structure. By doing so, the process validation platform enables generation of data that is representative of data within the data pipeline, while eliminating the need to receive real data associated with users associated with the data pipeline, which may present security, privacy, or regulatory concerns.

By storing the generated dataset within an accessible storage location (e.g., a cloud location), the process validation platform enables further retrieval (e.g., by other devices associated with test validation within the data transformation pipeline) and validation of associated processes. For example, the process validation platform provides the dataset derived from the metadata to a test generation model to generate a test record (e.g., including test parameters and criteria) and an associated code sample (e.g., in a suitable scripting language, such as a Structured Query Language (SQL)-type framework). By doing so, the process validation platform enables validation of data transformation processes using simulated data (e.g., excluding any sensitive or forbidden data), thereby improving the flexibility and robustness of the data transformation pipeline.

Moreover, in some implementations, the disclosed process validation platform enables user control over test parameters or testing code. For example, the process validation platform can display components or features of the test validation process, including metadata, test datasets, test records (e.g., test cases), and/or the associated code on a graphical user interface (e.g., using a HyperText Transfer Protocol (HTTP)) for review by a test administrator. Based on feedback from the test administrator's device or other suitable user devices (e.g., in response to detecting an indication of a modification to one of the components or features of the test validation process), the process validation platform can revise and update the components of the associated test protocol accordingly, thereby conferring increased control over automated testing to administrator devices over pre-existing systems.

The disclosed process validation platform can transmit the associated code (e.g., code sample) to a device associated with the data transformation pipeline (e.g., software development pipeline) to test relevant processes, nodes, and protocols. For example, the data transformation pipeline can compile and/or execute the generated code sample within a node associated with the data transformation pipeline, thereby enabling dynamic, automated, and supervised testing of complex data processing frameworks.

The inventors have also devised systems and processes for generating metadata structures based on existing datasets and associated schemas, thereby improving the accuracy and flexibility of the process validation platform disclosed herein. For example, the process validation platform can retrieve an existing dataset associated with the data transformation pipeline (e.g., including sensitive information linked to users of the pipeline). The process validation platform can validate the dataset (e.g., using a data validation model to generate a validation indicator that characterizes whether the dataset includes discrepancies or errors.

In response to a positive validation status, the process validation platform can provide the dataset to a metadata generation model (e.g., a natural language generation model) to generate a metadata schema that characterizes the components, formats, and/or conventions associated with the dataset. The metadata schema can include a textual description of columns, rows, or other features or portions of the input dataset. The process validation platform can generate a metadata structure by parsing the textual metadata schema generated at the metadata generation model, where the metadata structure is in a machine-readable or usable format for further data generation, processing, and evaluation. As such, the disclosed platform enables the automated generation of metadata schemas associated with datasets within a data transformation pipeline to enable test data generation and subsequent data pipeline testing in a modular manner, without relying on private, sensitive, or forbidden information. Furthermore, by dynamically generating metadata structures based on data detected within the data transformation pipeline, the process validation platform handles a variety of data types and data from different sources (e.g., by enabling evaluation of and standardization of associated metadata), thereby improving the resilience of data validation within the pipeline.

Additionally or alternatively, the disclosed process validation platform enables user control and correction of generated metadata structures. For example, the process validation platform generates graphical representations of metadata (e.g., where each graphical representation corresponds to a particular field or portion of the metadata). The graphical representations can include icons or user controls within an HTML-based webpage or web application. By allowing user modification of the data associated with the graphical representations, the process validation platform can update the associated portions of the generated metadata structures based on the user's indications, thereby improving the flexibility, modularity, and user control associated with generating, validating, or correcting metadata, thereby improving the accuracy of subsequent test data generation and data pipeline validation.

The inventors have also devised a process for generating test cases using simulated data in order to improve the flexibility, modularity, and resilience of data validation tasks associated with data transformation pipelines, such as software development environments. In some implementations, the process validation platform generates datasets associated with a metadata structure (e.g., as generated by a metadata generation model, modelled using existing data within the data transformation pipeline). For example, the process validation platform generates the datasets to include components or portions specified within the metadata (e.g., particular columns including associated values). By generating such data, the process validation platform enables generation of datasets for testing the data transformation pipeline, while preventing the disclosure and/or exposure of sensitive data associated with accounts or entities of the data transformation pipeline (e.g., account information or PII). Furthermore, the process validation platform enables generation of different types of data (e.g., originating from different sources and with different formats or specifications), thereby improving the flexibility and resilience of tests performed with respect to the data transformation pipeline. Furthermore, by generating data using custom, dynamically-generated metadata structures, the process validation platform enables generation of test cases with particular properties or characteristics (e.g., to enable testing of the data transformation pipeline's resistance to particular faults, deficiencies, or errors), thereby improving the applicability of validation tests.

In some implementations, the process validation platform enables user control and intervention in generated datasets. The process validation platform can generate a graphical representation of a generated dataset (e.g., including representations of simulated values, columns, or rows) and allow the user to modify such representations of the dataset. For example, the process validation platform detects when a user modifies a particular field or column associated with the dataset and generates a modification indicator that characterizes the nature of this modification. By doing so, the process validation platform can modify the dataset accordingly, thereby enabling dynamic supervision, control, and modification of automatically generated datasets by administrators or other suitable entities. Based on the generated dataset, the process validation platform can generate test cases and associated code samples that enable testing of the data transformation pipeline on the basis of the generated, simulated data.

The inventors have also devised a process for generating, evaluating, and executing code for testing components of a data transformation pipeline (e.g., a software development process) in an automated manner while retaining user supervision and control capabilities. For example, the process validation platform enables generation of code samples (e.g., in a format associated with a scripting framework, such as a programming language) that enables the testing of processes associated with the data transformation pipeline. The process validation platform can retrieve a code sample (e.g., associated with test samples and/or datasets generated as described above) and a data map, where the data map provides information relating to the relationships, links, and/or dependencies between data of the data transformation pipeline. For example, the data map includes information detailing fields within unprocessed and processed datasets that are to be correlated or related in a specified manner. By doing so, the process validation platform can consider required outcomes with respect to data processing and validation tasks within the data transformation pipeline.

The process validation platform can provide the code sample and the data map to a code validation model to generate a code validation report that characterizes the validity of the code sample (e.g., for validating processes of the data transformation pipeline). For example, the process validation platform generates a report that includes a textual summary of any deficiencies, errors, or suggestions associated with the code. The textual summary can include indications of algorithms, processes, or protocols that can improve the efficiency or accuracy of test validation.

In some implementations, the process validation platform can further improve the quality of the generated code by providing the code sample and the code validation report (e.g., the textual summary) to a code generation model (e.g., as described above) to generate an updated version of the code sample where any detected deficiencies or errors have been addressed. As such, by generating such a code validation report and leveraging the report to modify the generated code sample, the process validation platform improves the quality of generated validation tests.

In some implementations, the process validation platform provides the updated code sample to the data transformation environment to generate an output associated with the updated code sample. For example, the output can include a transformed dataset based on processing, using the data transformation pipeline, the dataset of the test case corresponding to the code sample. Additionally or alternatively, the output includes an indication of an error (e.g., an error code) associated with testing validating data within the data transformation pipeline, thereby enabling continual feedback with respect to code validation. For example, the process validation platform provides the indication of the error to the code generation model to train the code generation model to generate an improved data validation protocol for mitigating the detected error. By doing so, the disclosed process validation platform enables efficient execution of data validation tests with respect to data pipelines, while preserving the security, sensitivity, and user control associated with the data pipeline. Furthermore, by handling data from a variety of sources and of a variety of formats in a dynamic manner, the disclosed data validation platform confers improved resilience and stability to the data transformation pipeline by evaluating new data types in a dynamic, proactive manner.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Data Transformation and Validation Environment

FIG. 1 is a block diagram illustrating an environment associated with the process validation platform disclosed herein. The environment (e.g., a data transformation environment 100) can include a data transformation pipeline, such as a computational workflow associated with one or more nodes for executing complex processing tasks (e.g., as in a software development pipeline) For example, FIG. 1 includes components of network 102, including one or more servers 104 or 106. The network 102 can interface with or network access nodes 310 to communicate with devices external to, but communicable with, the network. Network access nodes 310 enable communication of devices, such as electronic devices 110-1 or 110-2 or one or more databases 116 with other devices or servers associated with the network 102 and/or the network access nodes 310. As such, the network 102 enables flexible communication between devices (e.g., electronic devices 110-1) at different locations, thereby enabling decentralization and collaboration between various nodes to enable the completion of complex data processing tasks.

The data transformation environment 100 can include a pipeline, framework, and/or workflow for receiving, retrieving, generating, modifying, and/or otherwise processing data associated with a system. For example, the data transformation environment 100 includes an environment for processing user accounts (e.g., associated with a telecommunications system), user requests, and/or other tasks. The data transformation environment 100 can include the network 102, including one or more servers 104 associated with processing data processing or data transformation tasks. The one or more servers 104 can include hardware or software components associated with data processing tasks. For example, the one or more servers 104 are associated with a data transformation pipeline. The data transformation pipeline can include a framework for generating, transforming, or processing data, such as data associated with user accounts of a telecommunications network. In some implementations, one or more servers 104 can include virtual machines (e.g., associated with a Kubernetes cluster) to process data processing tasks. In some implementations, the data transformation environment 100 includes one or more servers 106 with specialized functions. For example, the one or more servers 106 enable validation of the data transformation pipeline associated with the one or more servers 104 (e.g., via execution of associated data validation tests). In some implementations, the one or more servers 106 house the process validation platform disclosed herein. Additionally or alternatively, the process validation platform operates across various devices of the data transformation environment 100, including devices external to the network 102 (e.g., the electronic devices 110-1 and 110-2).

The data transformation environment 100 can include one or more databases (e.g., within and/or external to the network 102). For example, the data transformation environment 100 includes the database 114 enabling storage, retrieval, and/or analysis of data transformation pipeline-related data, such as user account data, test datasets, validation test parameters, machine learning model parameters and/or associated application programming interfaces (APIs), and/or other suitable data. The database 114 (and/or the database 116) can include hardware components, software components, or a combination thereof. In some implementations, the data transformation environment 100 can communicate with databases external to the network 102 (e.g., the database 116) and store data within such databases. Databases can be associated with distributed and/or localized architectures; for example, the database 116 and 114 can be incorporated into a common cloud storage system.

For example, the network 102 can include a 5G network, as described above. The network 102 can include servers 104 or 106, which can include one or more systems associated with the telecommunications network. For example, the server 106 can include hardware or software components associated with the functioning of the network access node 310-2, including storage, processors, or other components. Additionally or alternatively, the server 106 includes one or more components associated with a data transformation pipeline, such as the disclosed process validation platform. For example, the process validation platform can perform tasks associated with validating transformed and untransformed data associated with the data transformation environment (e.g., within a process flow). For example, the server 106 is undistributed and/or is distributed across one or more devices associated with validating processes associated with the data transformation environment 100. Additionally or alternatively, the data transformation environment 100 includes one or more servers 104 associated with executing data processing tasks.

For example, the environment 300 can include user equipment systems, such as electronic devices 110-1 and 110-2. A user equipment system can include hardware or software components associated with user equipment (e.g., an electronic device, such as a mobile device, a vehicle, or an unmanned aerial vehicle). For example, electronic devices 110 include user equipment systems. A user equipment system can include physical components, such as processors, storage media, user displays, and/or other components. In some implementations, the user equipment system can include or execute data processing tasks associated with the data transformation pipeline. In some implementations, a user equipment system can communicate with satellites, such as through a GPS interface. Network access nodes, such as the nodes 106-1 and 106-2, enable communication between electronic devices 110-1 and 110-2 and devices associated with the network 102. The user equipment systems can enable decentralized processing, validation, and/or monitoring of data transformation pipeline-related tasks, including the monitoring, modification, and/or generation of validation tests and associated parameters.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. Training data may be annotated with ground truth labels (e.g., each data entry in the training dataset may be paired with a label), or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (also referred to as update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publically-available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to a ML-based language model, there could exist non-ML language models. In the present disclosure, the term "language model" may be used as shorthand for an ML-based language model (i.e., a language model that is implemented using a neural network or other ML architecture), unless stated otherwise. For example, unless stated otherwise, the "language model" encompasses LLMs.

A language model may use a neural network (typically a DNN) to perform natural language processing (NLP) tasks. A language model may be trained to model how words relate to each other in a textual sequence, based on probabilities. A language model may contain hundreds of thousands of learned parameters or in the case of a large language model (LLM) may contain millions or billions of learned parameters or more. As non-limiting examples, a language model can generate text, translate text, summarize text, answer questions, write code (e.g., Phyton, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

In recent years, there has been interest in a type of neural network architecture, referred to as a transformer, for use as language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 2:
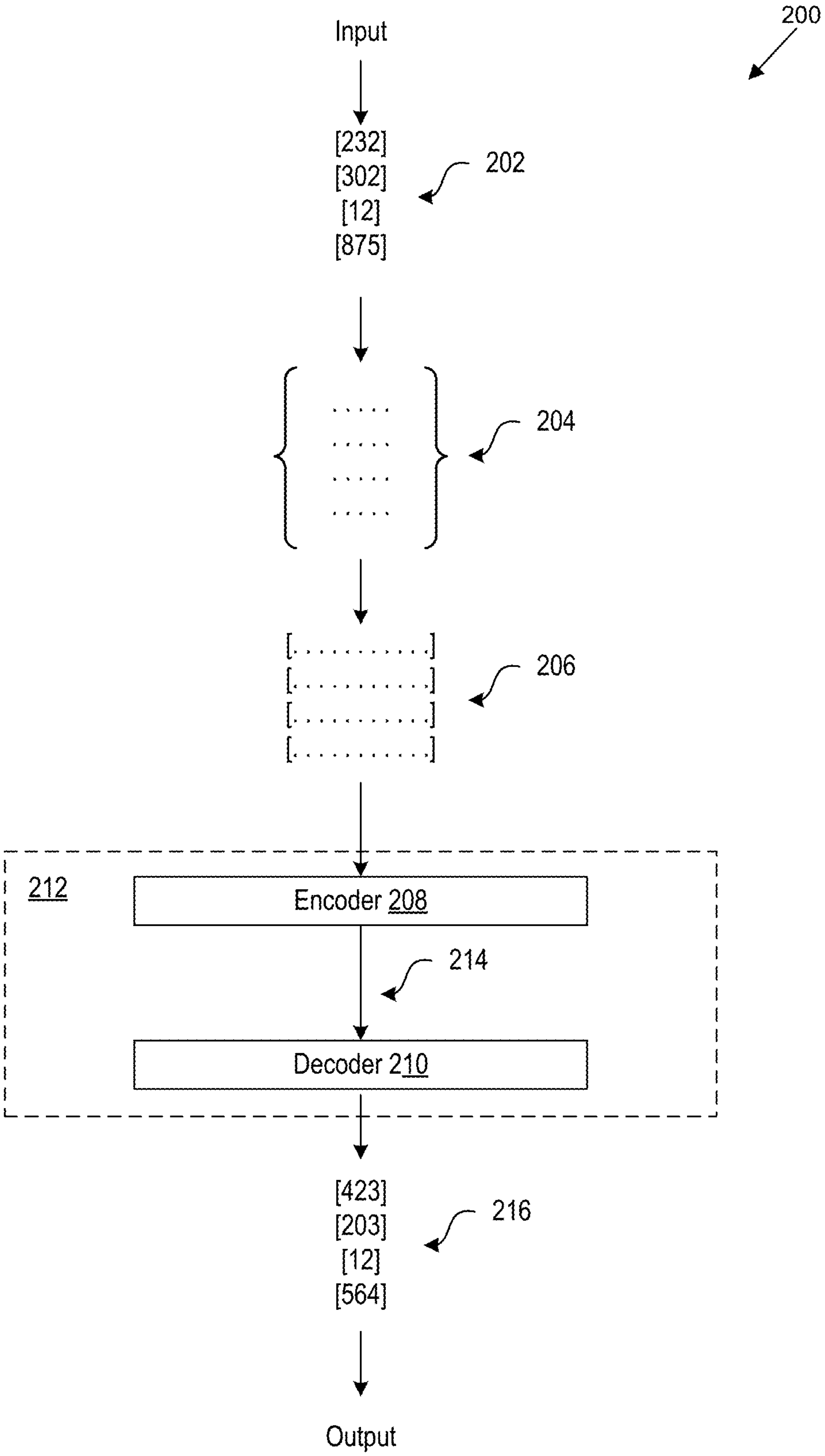
FIG. 2 is a block diagram of an example transformer.

FIG. 2 is a block diagram of an example transformer 212. A transformer is a type of neural network architecture that uses self-attention mechanisms to generate predicted output based on input data that has some sequential meaning (i.e., the order of the input data is meaningful, which is the case for most text input). Self-attention is a mechanism that relates different positions of a single sequence to compute a representation of the same sequence. Although transformer-based language models are described herein, it should be understood that the present disclosure may be applicable to any machine learning (ML)-based language model, including language models based on other neural network architectures such as recurrent neural network (RNN)-based language models.

The transformer 212 includes an encoder 208 (which can comprise one or more encoder layers/blocks connected in series) and a decoder 210 (which can comprise one or more decoder layers/blocks connected in series). Generally, the encoder 208 and the decoder 210 each include a plurality of neural network layers, at least one of which can be a self-attention layer. The parameters of the neural network layers can be referred to as the parameters of the language model.

The transformer 212 can be trained to perform certain functions on a natural language input. For example, the functions include summarizing existing content, brainstorming ideas, writing a rough draft, fixing spelling and grammar, and translating content. Summarizing can include extracting key points from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some embodiments, the transformer 212 is trained to perform certain functions on other input formats than natural language input. For example, the input can include objects, images, audio content, or video content, or a combination thereof.

The transformer 212 can be trained on a text corpus that is labeled (e.g., annotated to indicate verbs, nouns) or unlabeled. Large language models (LLMs) can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input). FIG. 2 illustrates an example of how the transformer 212 can process textual input data. Input to a language model (whether transformer-based or otherwise) typically is in the form of natural language that can be parsed into tokens. It should be appreciated that the term "token" in the context of language models and Natural Language Processing (NLP) has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some examples, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 2, a short sequence of tokens 202 corresponding to the input text is illustrated as input to the transformer 212. Tokenization of the text sequence into the tokens 202 can be performed by some pre-processing tokenization module such as, for example, a byte-pair encoding tokenizer (the "pre" referring to the tokenization occurring prior to the processing of the tokenized input by the LLM), which is not shown in FIG. 2 for simplicity. In general, the token sequence that is inputted to the transformer 212 can be of any length up to a maximum length defined based on the dimensions of the transformer 212. Each token 202 in the token sequence is converted into an embedding vector 206 (also referred to simply as an embedding 206). An embedding 206 is a learned numerical representation (such as, for example, a vector) of a token that captures some semantic meaning of the text segment represented by the token 202. The embedding 206 represents the text segment corresponding to the token 202 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 206 corresponding to the "write" token will be closer to another embedding corresponding to the "jot down" token in the vector space as compared to the distance between the embedding 206 corresponding to the "write" token and another embedding corresponding to the "summary" token.

The vector space can be defined by the dimensions and values of the embedding vectors. Various techniques can be used to convert a token 202 to an embedding 206. For example, another trained ML model can be used to convert the token 202 into an embedding 206. In particular, another trained ML model can be used to convert the token 202 into an embedding 206 in a way that encodes additional information into the embedding 206 (e.g., a trained ML model can encode positional information about the position of the token 202 in the text sequence into the embedding 206). In some examples, the numerical value of the token 202 can be used to look up the corresponding embedding in an embedding matrix 204 (which can be learned during training of the transformer 212).

The generated embeddings 206 are input into the encoder 208. The encoder 208 serves to encode the embeddings 206 into feature vectors 214 that represent the latent features of the embeddings 206. The encoder 208 can encode positional information (i.e., information about the sequence of the input) in the feature vectors 214. The feature vectors 214 can have very high dimensionality (e.g., on the order of thousands or tens of thousands), with each element in a feature vector 214 corresponding to a respective feature. The numerical weight of each element in a feature vector 214 represents the importance of the corresponding feature. The space of all possible feature vectors 214 that can be generated by the encoder 208 can be referred to as the latent space or feature space.

Conceptually, the decoder 210 is designed to map the features represented by the feature vectors 214 into meaningful output, which can depend on the task that was assigned to the transformer 212. For example, if the transformer 212 is used for a translation task, the decoder 210 can map the feature vectors 214 into text output in a target language different from the language of the original tokens 202. Generally, in a generative language model, the decoder 210 serves to decode the feature vectors 214 into a sequence of tokens. The decoder 210 can generate output tokens 216 one by one. Each output token 216 can be fed back as input to the decoder 210 in order to generate the next output token 216. By feeding back the generated output and applying self-attention, the decoder 210 is able to generate a sequence of output tokens 216 that has sequential meaning (e.g., the resulting output text sequence is understandable as a sentence and obeys grammatical rules). The decoder 210 can generate output tokens 216 until a special [EOT] token (indicating the end of the text) is generated. The resulting sequence of output tokens 216 can then be converted to a text sequence in post-processing. For example, each output token 216 can be an integer number that corresponds to a vocabulary index. By looking up the text segment using the vocabulary index, the text segment corresponding to each output token 216 can be retrieved, the text segments can be concatenated together, and the final output text sequence can be obtained.

In some examples, the input provided to the transformer 212 includes instructions to perform a function on an existing text. In some examples, the input provided to the transformer includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text. For example, the input can include the question "What is the weather like in Australia?" and the output can include a description of the weather in Australia.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as, for example, the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ a plurality of processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via its API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Process Validation Platform

Figure 3:
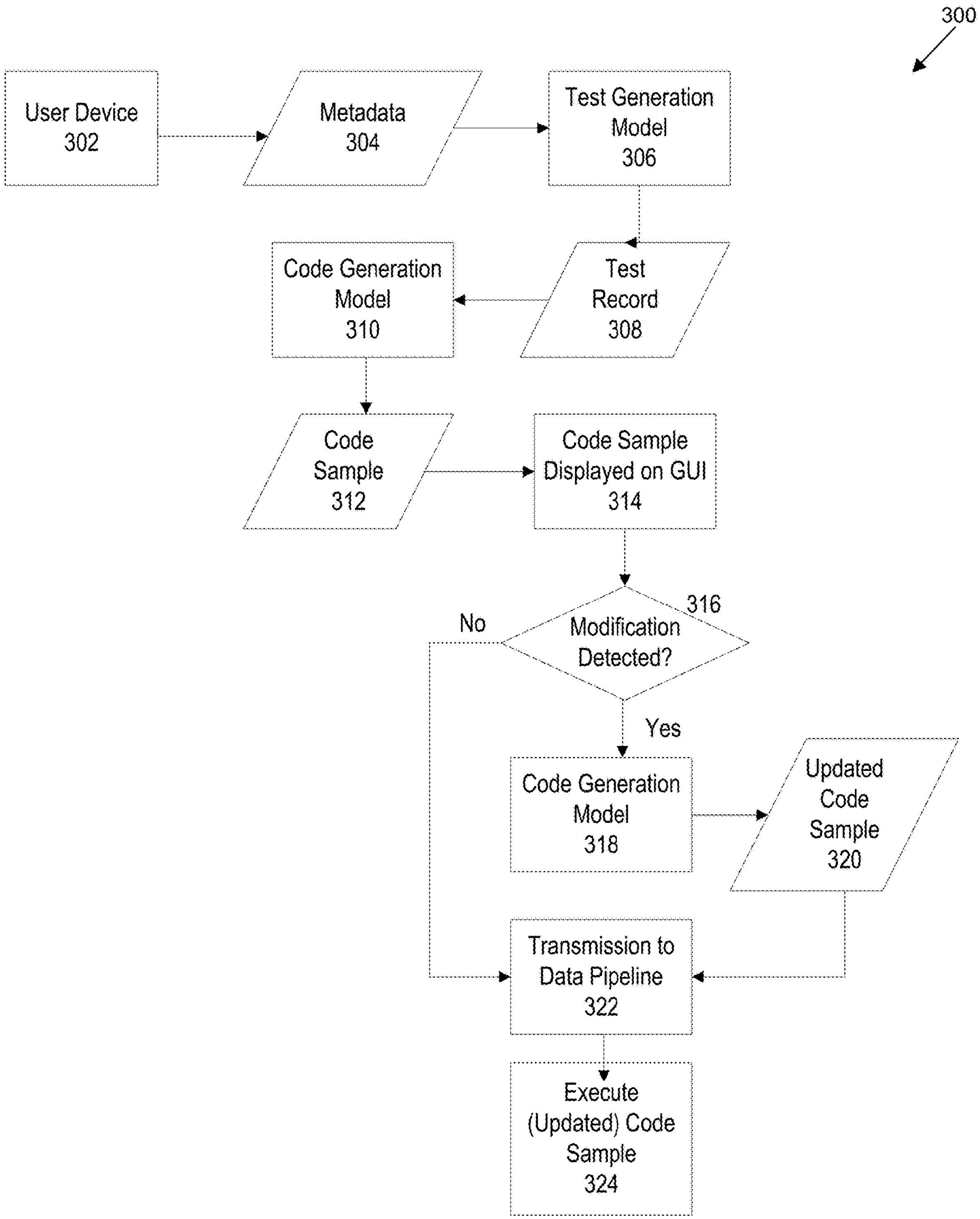
FIG. 3 is a schematic illustrating a flow for implementing automated validation tests based on simulated data.

FIG. 3 is a schematic illustrating a process 300 for implementing automated validation tests based on simulated data. The process 300 enables execution of a code sample for validating, testing, and/or otherwise monitoring processes associated with a data pipeline (e.g., the data transformation pipeline associated with the data transformation environment 100), based on simulated test data.

The process validation platform can receive metadata from a user device 302 (e.g., associated with the data transformation pipeline) that describes, characterizes or defines data associated with the data transformation pipeline. For example, the metadata includes a metadata structure that describes a schema associated with data that can be used to validate or test the pipeline. The metadata structure can include record identifiers (e.g., identifying particular portions of the associated datasets and/or other relevant features) and corresponding descriptors of the particular portions of the dataset. For example, the metadata structure includes descriptive, structural, administrative, technical, and/or provenance metadata. Descriptive metadata can include information describing the content of associated or target datasets. Structural metadata can define the format, structure, and/or relationships between data elements within a dataset, including file formats, data models, and/or schemas. Administrative metadata can include information for managing data, including creation dates, modification dates, access rates, and/or data provenance. Technical metadata can include information relating to technical aspects of the data (e.g., encoding, compression, and/or hardware/software requirements). Provenance metadata can include information relating to the origin and/or history of the data, including the source, transformations, and/or lineage of the data. By generating and/or retrieving such metadata structures, the process validation platform disclosed herein enables generation of test data that is consistent with the data pipeline to improve the availability, quality, and flexibility associated with testing the data transformation pipeline.

The descriptors associated with the metadata structure can include textual and/or non-textual information describing aspects of the associated dataset. For example, the descriptor can include a textual description of a format and/or variable type associated with a particular column of the dataset. In some implementations, a descriptor is linked with a record identifier that identifies a particular portion, aspect, or feature of the associated datasets (e.g., an identifier of a column number and/or row number of the dataset). As such, the metadata structure can include a complete description of the requirements, ranges, and/or characteristics of data that is consistent with the metadata structure.

In some implementations, the metadata 304 includes a metadata structure that includes values and fields. For example, the metadata structure includes an identifier of a first portion of the metadata structure, as identified by a tag, that indicates the particular function of the field associated with the metadata structure. The field can include one or more values associated with the field (e.g., associated with a particular descriptor). As such, the metadata structure includes information that is descriptive and enables the process validation platform to generate associated test data that is accurate and consistent with data associated with the data transformation pipeline.

The process validation platform can validate the metadata 304 using a metadata validation model. For example, the process validation platform provides the metadata structure associated with the metadata 304 to a metadata validation model to generate a validation indicator that indicates the validity of the first metadata structure. The metadata validation model can include one or more natural language models and/or other ML models (e.g., as described in relation to FIG. 2) that enable the generation of validation indicators associated with the metadata structure. For example, a validation indicator includes an indication of the validity of the metadata structure (and/or other data, such as of a dataset). In some implementations, the process validation platform examines the metadata structure, via the metadata validation model, with respect to validation rules associated with the metadata structure. Such validation rules can include criteria, such as a requirement that metadata structures not contain missing data or data of a particular size or format.

The validation indicator can include textual descriptions (and/or other non-text information, such as audio, videos, or images) associated with errors, deficiencies, and/or issues with the metadata structure. Additionally or alternatively, the validation indicator includes a quality metric associated with the metadata structure (and/or other suitable data), such as by providing the metadata structure to a natural language processing model, such as an LLM. By doing so, the process validation platform enables evaluation, monitoring, and resolution of issues associated with metadata structures or other suitable data.

A deficiency associated with data (e.g., a dataset or a metadata structure) can include an indication of missing values, values of the wrong format, technical deficiencies (e.g., with encryption standards or compression), and/or other such information. For example, a deficiency includes an indication of missing data and/or corrupted portions of the metadata structure or associated data. For example, a deficiency includes a textual description of an error, with a verbal description of the nature and location of the detected error. By evaluating data associated with the data transformation pipeline, including metadata structures, the process validation platform enables improved validation, quality control, and optimization of the data processing workflow.

The process validation platform can generate test data based on the requirements or information within the metadata structure. For example, the process validation platform provides the metadata structure to a data generation model to generate data that is of a format or disposition that is consistent with the requirements within the metadata structure. The data generation model can include one or more LLMs (as described in relation to FIG. 2). For example, the data generation model generates a textual representation of a dataset with data records (e.g., including fields and values), where the fields and values of the dataset are consistent with descriptors of the metadata structure. The generated dataset can include tabular data including columns of data, each of which represents values of a particular type and/or descriptor of the metadata structure. The generated dataset can include one or more rows corresponding to particular simulated data records (e.g., associated with simulated user accounts).

The process validation platform can provide the test datasets associated with the metadata 304 to a test generation model 306 to generate a test record 308. For example, the test generation model generates data entities that simulate real data that would be processed by the data transformation pipeline to ensure that it adheres to the expected structure and constraints. For example, the test generation model generates a test record (e.g., a test case) including parameters of a validation test for the generated dataset, including test conditions or criteria (e.g., in a textual format). The test conditions can include schema validation, format validation, range checks, format validation, uniqueness constraints, referential integrity, data consistency, and/or other similar requirements (e.g., as described within a text-based description).

The test generation model can provide the test record 308 to a code generation model 310 to generate a code sample 312. The code sample can include a script (e.g., an SQL script) that enables execution of the generated simulated validation test. For example, the code sample can be associated with a particular scripting framework (e.g., a scripting language) and can include algorithms that enable verification of whether the test dataset complies with the associated test conditions or criteria. For example, the code sample includes a textual representation (e.g., as generated by an LLM) of code that can be compiled and/or executed within the data transformation pipeline to enable validation of the functioning of the data validation pipeline using the generated test dataset.

In some implementations, the process validation platform generates a representation of the code sample 312 for display on a graphical user interface (e.g., at process 314) of a user device (e.g., an administrator device associated with the electronic device 110-1 or 110-2). For example, the graphical user interface can include an HTML-type interface that enables users to monitor, view, and/or modify information associated with test cases, such as code, test data, and/or the associated metadata. For example, the graphical user interface includes text boxes, user controls, and/or drop-down menus to enable modification of the test parameters and test data using an HTML-type interface. In some implementations, the graphical user interface can utilize other protocols or markup-languages, including Javascript or other suitable interface frameworks.

At process 316, the process validation platform can detect whether a component of the graphical user interface (e.g., a code sample) has been modified. When the process validation platform detects that the code sample has not been modified, the process validation platform can provide the associated code sample to the data transformation pipeline (e.g., at the process 322) to enable execution of the code sample to execute the validation test. Additionally or alternatively, the process validation platform detects that the user has modified one or more components of the validation test (e.g., the test dataset, the metadata structure, the test case, and/or the code sample) and can generate an updated code sample 320 by providing the code sample and an indication of the detected modification to the code generation model 318.

The indication of the detected modification can include an indication of a portion of the code sample and/or other associated information that has been interacted with by a user of the graphical user interface (e.g., replaced, clicked on, and/or otherwise interacted with). For example, the indication of the modification includes an indication of a location within the code sample to modify, as well as an associated modification performed by the user. The process validation platform can provide the indication of the modification and the code sample to the code generation platform to generate an updated code sample with the suitable modification, thereby enabling improved user control over the parameters, values, and/or other features of the tests to be performed within the data transformation pipeline. The process validation platform can transmit the code sample (e.g., the updated code sample) to a device associated with the data transformation pipeline (e.g., one of servers 106) to enable execution of the associated validation test, according to the simulated test data and the associated user-controlled test parameters and algorithm.

Process for Dynamic, User-Controlled Data Validation Test Execution

Figure 4:
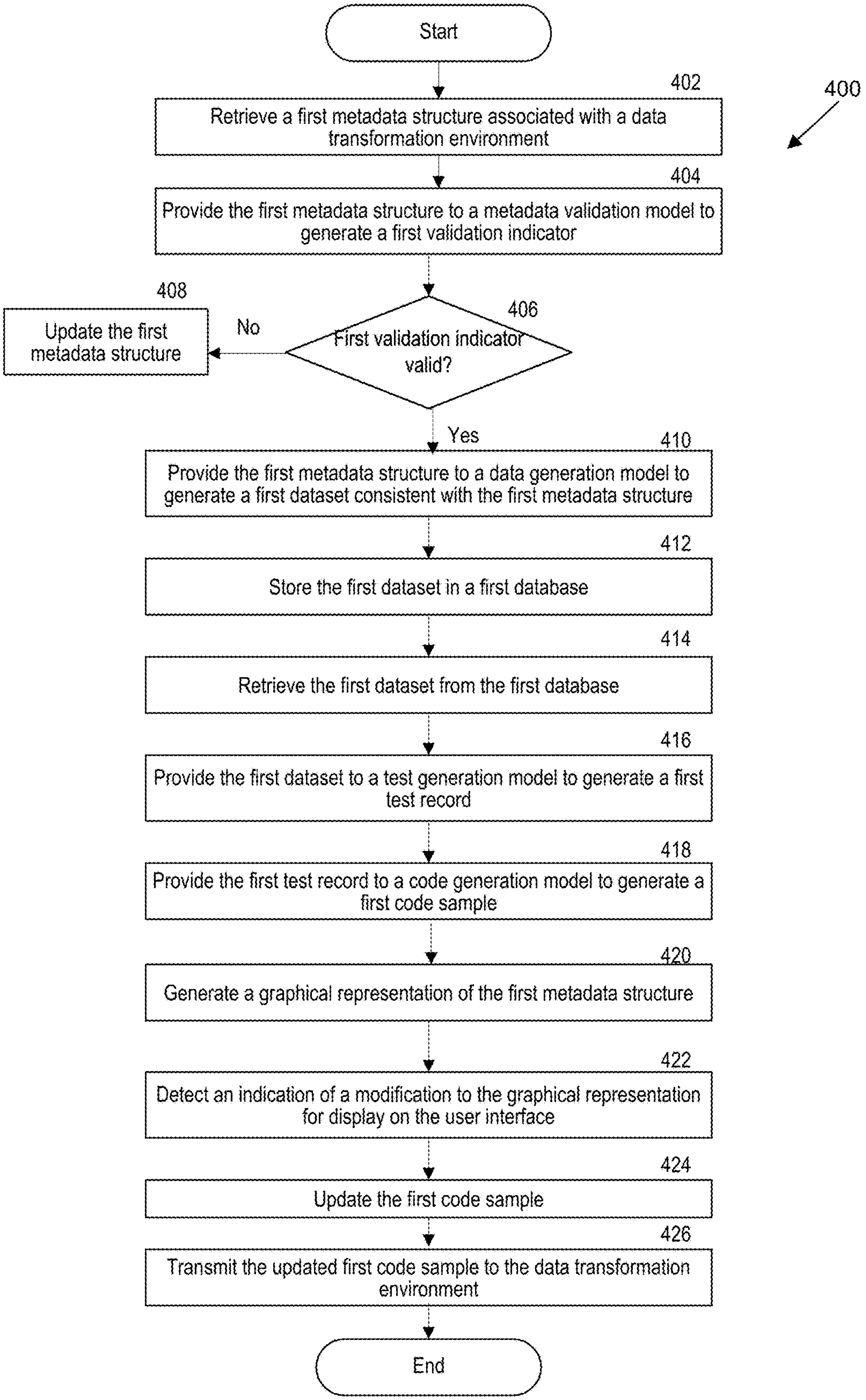
FIG. 4 is a flowchart illustrating a process for implementing user-controlled data validation tests based on simulated data.

FIG. 4 is a flowchart illustrating a process 400 for implementing user-controlled data validation tests based on simulated data. For example, the process 400 enables the simulation of data for the generation of executable data validation tests associated with a data transformation pipeline (e.g., a software development environment) to improve the security, efficiency, and resilience of the data transformation pipeline and associated data validation procedures.

At operation 402, the process validation platform can retrieve a first metadata structure associated with a data transformation environment. For example, the process validation platform retrieves, from a first database and using a first device, a first metadata structure associated with a data transformation environment. The first metadata structure can include a first set of descriptors associated with record identifiers of the first metadata structure. As an illustrative example, the process validation platform retrieves a structured version of a schema that includes elements, attributes, and relationships thereof as pertaining to a particular dataset or type of datasets. For example, a metadata structure includes a set of descriptors that describe fields associated with particular tags, where such descriptors describe the type of data within a portion of the dataset (e.g., within particular columns). By retrieving such information, the process validation platform can handle data of a variety of formats, structures, or sources, thereby improving the resilience and flexibility of data validation and testing with respect to the data transformation environment.

At operation 404, the process validation platform can provide the first metadata structure to a metadata validation model to generate a first validation indicator that indicates whether the metadata structure is valid. For example, the process validation platform provides the first metadata structure to a metadata validation model to generate a first validation indicator indicating whether the first metadata structure is valid according to validation rules. As an illustrative example, the process validation platform generates a validation indicator that indicates whether the metadata structure retrieved at the process validation platform is parsable and contains no errors or ambiguities according to validation rules (e.g., as pre-determined and/or dynamically determined). For example, the validation indicator can include a Boolean-type value (e.g., a 0 or a 1) indicating whether the metadata structure is valid. By evaluating the quality and suitability of the retrieved metadata, the process validation platform enables improved monitoring and mitigation of ambiguities, deficiencies, or inconsistencies in data type and format associated with the data transformation pipeline, while enabling handling of a variety of data types.

In some implementations, the process validation platform generates a validation indicator that provides information relating to indications of errors or other deficiencies associated with the retrieved metadata. For example, the process validation platform extracts a first descriptor of the first set of descriptors. The first descriptor can be associated with a first record identifier of the first metadata structure. The process validation platform provides the first descriptor to the metadata validation model to generate an indication of an error associated with the first descriptor. The indication of the error can include an identification of a deficiency associated with the first descriptor. In response to generating the indication of the error, the process validation platform can determine that the first validation indicator indicates that the first metadata structure is not valid. As an illustrative example, the process validation platform generates a textual report indicating any ambiguities, errors, or deficiencies associated with the metadata, such as missing values, missing descriptors, and/or inconsistent relationships between values. The textual report can be generated via an LLM or another suitable natural language generation model (e.g., associated with the metadata validation model). By generating such information, the process validation platform enables mitigation and/or correction of any such deficiencies prior to generating test data and associated test scripts.

At operation 406, the process validation platform can determine whether the metadata structure is valid. As an illustrative example, the process validation platform determines whether the first validation indicator indicates that the retrieved metadata structure is valid. As an illustrative example, the process validation platform can provide the textual report associated with the validation indicator to a natural language generation model to determine a quality metric value associated with the metadata structure. Based on comparing the quality metric value with a threshold value, the process validation platform can determine whether the validation indicator indicates that the metadata structure is sufficiently detailed, accurate, and consistent, thereby validating the metadata structure.

In some implementations, at operation 408, based on determining a deficiency or error in the metadata structure (e.g., in response to determining that the validation indicator indicates that the metadata structure is not valid), the process validation platform can determine to update the metadata structure to resolve the deficiency or error. In some implementations, the process validation platform updates the first metadata structure based on deficiency information captured within the first validation indicator. For example, in response to determining that the first validation indicator indicates that the first metadata structure is not valid, the process validation platform updates the first descriptor based on the identification of the deficiency. The process validation platform can update the first metadata structure to include the updated first descriptor associated with the first record identifier. The process validation platform can provide the updated first metadata structure to the data generation model to generate the first dataset consistent with the updated first metadata structure. For example, the process validation platform provides the validation indicator (e.g., a textual summary) and a textual representation to a metadata generation model to generate a corrected metadata structure (e.g., with filled in values instead of missing values). By doing so, the process validation platform enables dynamic evaluation, monitoring, and resolution of deficiencies in metadata associated with datasets of the data transformation pipeline.

At operation 410, in response to determining that the first metadata structure is valid, the process validation platform can provide the first metadata structure to a data generation model to generate a first dataset according to the metadata structure. For example, in response to determining that the first validation indicator indicates that the first metadata structure is valid according to the validation rules, the process validation platform provides the first metadata structure to a data generation model to generate a first dataset consistent with the first metadata structure. As an illustrative example, the process validation platform generates a dataset with fake values (e.g., simulated values), where the values correspond to data as defined, structured and/or standardized within the associated metadata structure. By doing so, the process validation platform enables the generation of test cases associated with testing the data transformation pipeline using non-sensitive (e.g., non-forbidden) data in an automated manner, thereby improving the ability of the process validation platform to validate data flows through the data transformation pipeline.

In some implementations, the process validation platform generates the first dataset based on descriptors within the metadata structure. For example, the process validation platform extracts a first descriptor from the first metadata structure. The first descriptor can be associated with a first record identifier of the first metadata structure. The process validation platform can provide the first descriptor to the data generation model to generate a first data record. The first data record can include data consistent with a textual description of the first descriptor. The process validation platform can generate the first dataset including the first data record associated with the first descriptor. As an illustrative example, the process validation platform generates the dataset by determining fields or tags and corresponding descriptors within the metadata structure. The process validation platform can provide such descriptors to the data generation model (e.g., an associated natural language processing model) to generate a data record that is consistent with the descriptor of the metadata structure and store this data record within the dataset. By doing so, the process validation platform enables generation of data according to attributes or characteristics as defined within the metadata structure, thereby ensuring compatibility between the generated test data (e.g., for subsequent validation tests) and the associated data format or type restrictions.

At operation 412, the process validation platform can store the first dataset in the first database. As an illustrative example, the process validation platform stores the first dataset within a cloud database accessible to other devices, servers, and/or entities of the validation platform and/or the data transformation pipeline. As such, the process validation platform enables decentralized generation of test cases and/or evaluation of data flows across the network and/or system.

At operation 414, the process validation platform can retrieve (e.g., using a second device) the first dataset from the first database. As an illustrative example, the process validation platform, via a second device associated with the data transformation environment, retrieves the generated dataset (e.g., to be used to generate test cases for testing the health of the data transformation pipeline). By doing so, the process validation platform can evaluate the performance of simulated data within the data transformation pipeline without relying on any sensitive or forbidden data.

At operation 416, the process validation platform can provide the dataset to a test generation model to generate a test record that enables validation of the data transformation environment. For example, the process validation platform provides the first dataset to a test generation model to generate a first test record for the first metadata structure. As an illustrative example, the test record includes information and/or parameters associated with executing a validation test with respect to the data transformation pipeline (e.g., a software development pipeline). For example, the test record includes an indication of a test case that includes preconditions, steps, and/or expected results with respect to a particular process, protocol, or algorithm within the data transformation pipeline. For example, the test record includes an indication of the data to be tested, as well as criteria with respect to any results of processing such data (e.g., test criteria). By generating the test record, the process validation platform enables generation of test cases for execution within the data transformation pipeline on a dynamic, simulated, and automated basis, thereby precluding the need for human intervention, while protecting any real sensitive or forbidden information.

In some implementations, the process validation platform generates the first test record according to a determined test condition. For example, the process validation platform provides the first dataset to the test generation model to generate a first test condition, wherein the first test condition includes an indication of a criterion for validation of test data. The process validation platform can generate the first test record including a representation of the first test condition. As an illustrative example, the process validation platform generates an indication of a requirement for data completion, data accuracy, transformation logic, data integrity, performance, and/or reliability. By doing so, the process validation platform can specify particular parameters and/or requirements that indicate the success of a particular test.

At operation 418, the process validation platform can provide the first test record to a code generation model to generate a first code sample to enable testing, validating, and/or evaluating the data transformation environment or associated pipeline. For example, the process validation platform provides the first test record for the first metadata structure to a code generation model to generate a first code sample associated with the first test record. The first code sample can include code data for executing a test algorithm with respect to the first test record. As an illustrative example, the process validation platform provides the test record to a code generation model that enables generation of a script (e.g., in a particular scripting language) to be executed within the data transformation pipeline to test particular nodes, processes, and/or workflows. For example, the process validation platform generates a code snippet or a code sample (e.g., in an SQL-based language) for execution within the data transformation platform. By doing so, the process validation platform can generate an executable test based on simulated data with little-to-no human intervention, thereby improving the efficiency of workflow testing.

In some implementations, the process validation platform generates the first code sample according to test conditions and a scripting framework (e.g., an indication of a scripting language or philosophy). For example, the process validation platform receives, from the first device, an indication of a scripting framework. The process validation platform can retrieve a representation of a set of test conditions associated with the first test record. The process validation platform can provide the representation of the set of test conditions and the indication of the scripting framework to the code generation model to generate the first code sample. The first code sample enables execution of a test algorithm for testing the set of test conditions of the first test record with respect to the first dataset. As an illustrative example, the process validation platform retrieves or receives (e.g., from an administrator device that has knowledge of the nature of the data transformation pipeline) an indicator of a particular scripting language or protocol for execution of the data validation test. Based on this indicator, as well as information relating to the conditions and/or criteria for of the test, the process validation platform generates a set of executable and/or compilable code that enables testing data of the data transformation pipeline according to the test conditions specified.

At operation 420, the process validation platform can generate a graphical representation of the first metadata structure for display on a user device (e.g., to enable user monitoring, control, and/or flexibility with respect to data validation). For example, the process validation platform generates a graphical representation of the first metadata structure, the first test record, and the first code sample for display on a user interface. As an illustrative example, the process validation platform generates, within an HTML-based graphical user interface of a user device, a graphical representation of the elements associated with the test case, including the data to be tested, the conditions associated with the test, and the resulting executable and/or compilable code. By doing so, the process validation platform enables human intervention and/or monitoring of test data creation and test execution, thereby conferring improved control to test administrators.

At operation 422, the process validation platform can detect an indication of a modification to a first graphical representation on the user interface. For example, the process validation platform detects an indication of a modification to the graphical representation for display on the user interface. As an illustrative example, the process validation platform can detect a user modifying a value associated with one of the components associated with the test case, such as a modification within a text-box to a line of code within the code sample. By detecting such modifications, the process validation platform can determine a modification indicator that indicates how the test case is to be modified, thereby enabling user control of the data validation process.

At operation 424, the process validation platform can update the first code sample according to the detected indication of the modification. For example, in response to detecting the indication of the modification, the process validation platform updates the first code sample. As an illustrative example, the process validation platform updates the code sample according to the user's modification of the code sample within the graphical user interface. To illustrate, the process validation platform determines that the user deletes a line of code within the graphical representation of the code sample; in response to detecting such an action, the process validation platform can update the code sample to incorporate such modification. By doing so, the process validation platform enables administrator control over test parameters, algorithms, or data via interactions within the graphical user interface, thereby enabling a hybrid automated and manual test validation environment.

In some implementations, the process validation platform updates the first code sample using a record identifier and an associated updated descriptor of the relevant portion of the associated dataset. For example, the process validation platform determines that the indication of the modification includes (1) a first record identifier of the first metadata structure and (2) an updated descriptor associated with the first record identifier. The process validation platform can update the first metadata structure according to the first record identifier and the updated descriptor. The process validation platform can provide the updated first metadata structure to the data generation model to generate a second dataset consistent with the updated first metadata structure. The process validation platform can provide the second dataset to the test generation model to generate a second test record. The process validation platform can provide the second test record to the code generation model to generate a second code sample associated with the second test record. The process validation platform can update the first code sample to include the second code sample. As an illustrative example, the process validation platform identifies a record within the metadata structure that corresponds to a description of a particular column of the test dataset to be used within the validation test. The record can include information of a particular type, as described by the descriptor. The process validation platform can detect modification of this description by the user (e.g., via the graphical user interface) and update the dataset to be used in the validation test according to this change in metadata type. As such, the process validation platform enables improved control over the data used in data validation tests, thereby improving the flexibility and manageability of the data validation process.

At operation 426, the process validation platform can transmit the updated first code sample to the data transformation environment to enable data validation and testing within an associated data pipeline. For example, the process validation platform transmits the updated first code sample to the data transformation environment to enable dynamic testing of the data transformation environment using test records. As an illustrative example, the process validation platform transmits the code sample (and/or a compiled version thereof) to a device associated with the data transformation environment, such as a particular device associated with a node or process to be tested. By doing so, the process validation platform enables testing of particular components or portions of the data transformation pipeline based on simulated, supervised tests.

Metadata Structure Generation

Figure 5:
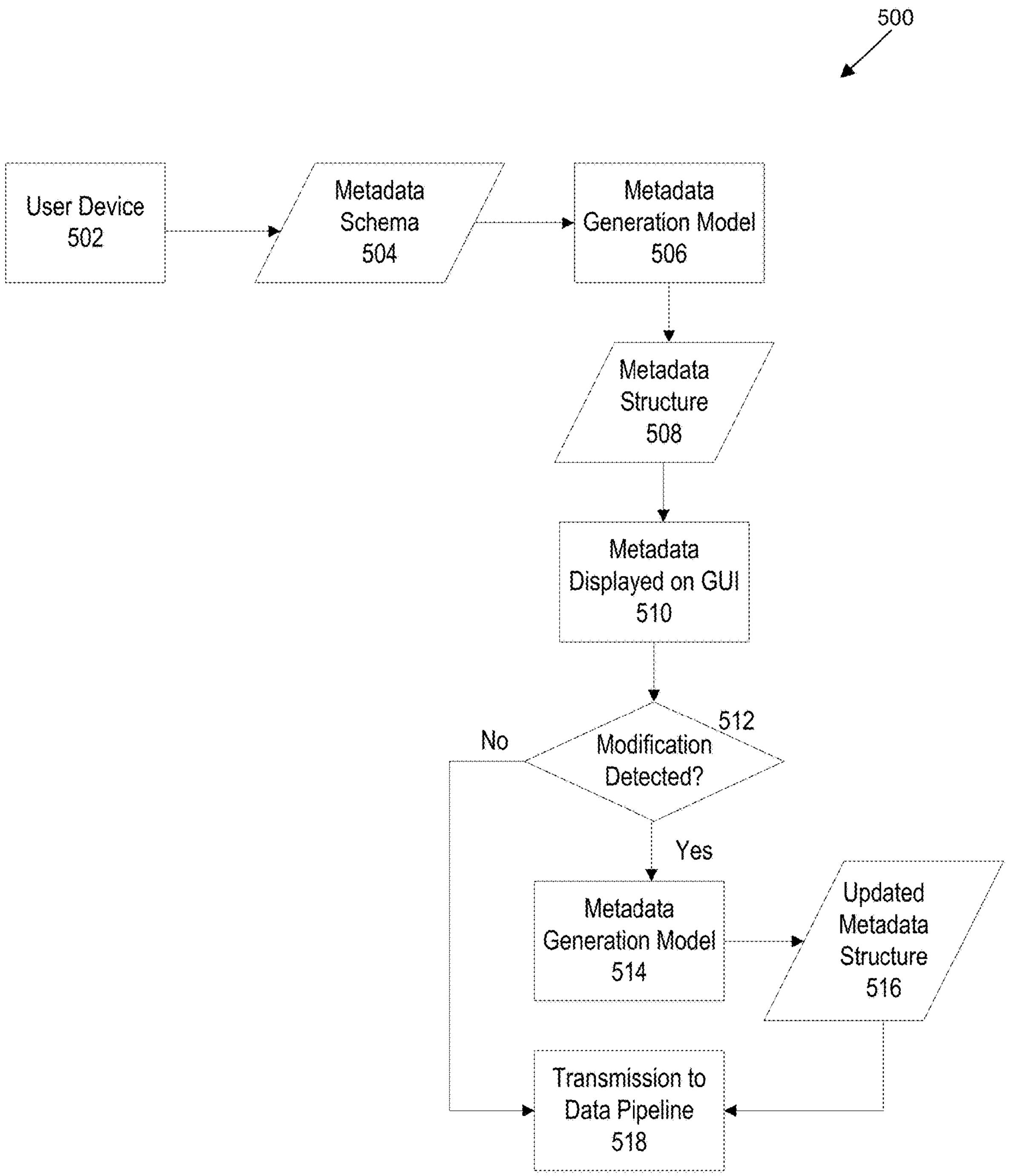
FIG. 5 is a schematic illustrating a flow for generating metadata structures based on metadata schemas while enabling user oversight of metadata generation.

FIG. 5 is a schematic illustrating a flow 500 for generating metadata structures based on metadata schemas while enabling user oversight of metadata generation. For example, flow 500 enables generation of metadata based on existing datasets associated with the data transformation pipeline, thereby enabling automated, efficient generation of test cases on the basis of metadata associated with the system. For example, the process validation platform disclosed herein enables generation of accurate metadata schemas (e.g., by fixing existing metadata schemas and/or detecting issues or deficiencies in the associated data).

The user device 502 can retrieve a first dataset associated with the data transformation environment and provide the dataset to a data validation model to generate a validation indicator (as described above) indicating the validity of the dataset. In response to determining that the dataset is valid, the process validation platform can provide the first dataset to a metadata generation model 506 (e.g., an LLM as described in relation to FIG. 2) to generate a metadata schema associated with the first dataset, where the metadata schema includes textual information characterizing the nature of the dataset (e.g., characterizing the column names and/or other metadata associated with the data). For example, the metadata schema includes information associated metadata structures (e.g., as described in relation to FIG. 4) in a textual form (e.g., as generated by the LLM).

A metadata generation model can include a model, such as an LLM, that enables generation of a metadata schema and/or a metadata structure based on input datasets. For example, the metadata generation model accepts structured or unstructured data as input (e.g., as associated with the data transformation platform) and outputs a textual representation of metadata (e.g., in the form of a response from an LLM). For example, the textual representation of metadata includes information describing the format, structure, organization, and/or other attributes of the associated dataset, as described in relation to FIG. 3 with respect to the metadata structure. By generating such descriptions of metadata using an LLM, the metadata generation model enables flexible generation of information characterizing or describing datasets of a variety of formats or quality, thereby improving the resilience of the data transformation pipeline and associated validation tests. In some implementations, the metadata generation model can accept a version of a metadata structure and/or metadata schema and can generate an updated version of the metadata structure (e.g., by validating and/or filling in missing values associated with the metadata).

The process validation platform generates a metadata structure 508 based on the metadata schema (e.g., as generated by the LLM). For example, the process validation platform provides the metadata schema (e.g., a textual representation or description of the metadata associated with the first dataset) to a parsing algorithm to generate a structured version of the metadata schema. The parsing algorithm can determine record identifiers and associated descriptors (e.g., as described in relation to FIG. 3) associated with the metadata schema to generate the metadata structure 508. By doing so, the process validation platform prepares the metadata generated via the LLM in a format that can be processed to generate test data.

At operation 510, process validation platform can display the metadata on a graphical user interface associated with a user device of the data transformation environment 100

(e.g., the electronic device 110-1). To illustrate, the process validation platform generates information associated with the generated metadata on an HTML-based web application, enabling modifications to portions of the metadata structure by the user via the interface. For example, the graphical user interface displays descriptors associated with portions (e.g., columns) of associated datasets, as well as the corresponding tags (e.g., record identifiers). The graphical user interface can utilize user controls (e.g., textboxes, drop-down menus, or similar controls) to enable modification of the descriptors and/or tags.

At operation 512, the process validation platform determines whether the user has modified and/or interacted with a graphical representation of the metadata within the graphical user interface. For example, in response to determining that the user has interacted with the graphical user interface (e.g., via a user control associated with the HTML-based interface), the process validation platform can (e.g., at operation 514) determine an indication of a modification requested by the user (e.g., via the user control) and provide this indication and the metadata structure to the metadata generation model to generate an updated metadata structure 516 that satisfies the modification request by the user via the graphical user interface. The process validation platform can transmit the updated metadata structure to the data pipeline (e.g., at operation 518) for further generation of associated test data and/or associated code samples. In some implementations, the process validation platform determines that no modification has been detected and transmits the originally generated metadata structure to the data pipeline (e.g., at operation 518) accordingly.

Process for Implementing User-Controlled Metadata Generation

Figure 6:
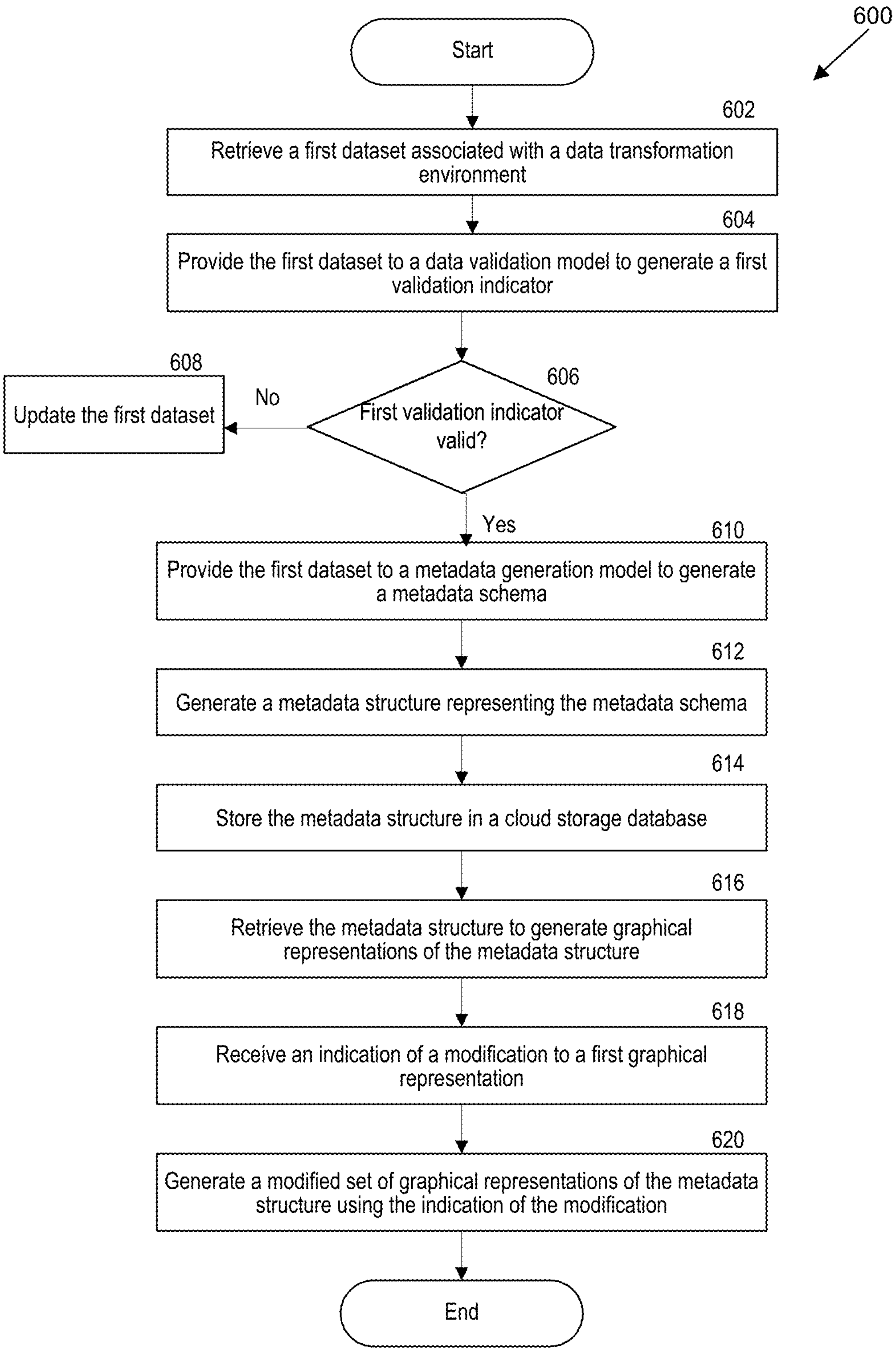
FIG. 6 is a flowchart illustrating a process for implementing user-controlled metadata generation based on metadata evaluation.

FIG. 6 is a flowchart illustrating a process 600 for implementing user-controlled metadata generation based on metadata evaluation. For example, the process 600 enables the process validation platform to generate metadata based on pre-existing datasets associated with the data transformation environment (e.g., that include sensitive or forbidden data), for the generation of simulated test data on the basis of such metadata.

At operation 602, the process validation platform can retrieve a dataset associated with the data transformation pipeline (e.g., a software development flow). For example, the process validation platform retrieves, from a first database, a first dataset associated with a data transformation environment. As an illustrative example, the process validation platform retrieves a dataset associated with sensitive information (e.g., account-holder information) that cannot be shared, transmitted, or disclosed freely. By receiving such data (e.g., at a secure device associated with the data transformation environment), the process validation platform enables generation of simulated data similar to such data, while protecting the sensitivity of such private information. Furthermore, the process validation platform can generate greater numbers of such datasets based on a single retrieved dataset, thereby improving the amount of data available for testing the data transformation pipeline.

At operation 604, the process validation platform can provide the first dataset to a data validation model to generate a validation indicator characterizing the validity (e.g., accuracy and/or quality) of the dataset. For example, the process validation platform provides the first dataset to a data validation model to generate a first validation indicator to validate the first dataset indicating whether the first dataset is valid. As an illustrative example, the process validation platform generates a validation indicator that specifies whether or not the first dataset complies with any requirements (e.g., data completion, accuracy, and/or other similar requirements). To illustrate, the validation indicator includes a value (e.g., a 0 or 1) or a metric value (e.g., on a scale from 0 to 100) indicating the quality of the dataset. By evaluating the dataset, the process validation platform can improve the quality of metadata generated based on this dataset, thereby preventing the generation of broken or unsuitable test data due to inaccurate or unsuitable source datasets.

In some implementations, the process validation platform generates an indication of an error or deficiency associated with the dataset (e.g., as the validation indicator). For example, the process validation platform extracts a first data record of the first dataset. The first data record can be associated with a first record identifier of the first dataset. The process validation platform provides the first data record to the data validation model to generate an indication of an error associated with the first data record. The indication of the error can include an identification of a deficiency associated with the first data record. In response to generating the indication of an error, the process validation platform can determine that the first validation indicator for the first dataset indicates that the first dataset is not valid. As an illustrative example, the process validation platform generates an indication of a deficiency (e.g., a textual description of a missing value, missing column, or other such deficiencies associated with the dataset). By doing so, the process validation platform enables targeted mitigation of errors or deficiencies associated with datasets, to enable prompt resolution and generation of test cases.

At operation 606, the process validation platform can determine if the first validation indicator is valid. For example, the process validation platform can compare a quality metric value with a threshold value to determine whether the dataset is sufficiently accurate, reliable, or complete. In some implementations, the process validation platform determines that the validation indicator includes an indication of a deficiency or an error; in response to such a determination, the process validation platform can determine that the dataset is invalid.

At operation 608, the process validation platform can update the first dataset according to detected deficiencies or errors within the dataset. For example, in response to determining that the first validation indicator for the first dataset indicates that the first dataset is not valid, the process validation platform updates the first data record based on the identification of the deficiency. The process validation platform can update the first dataset to include the updated first data record associated with the first record identifier. The process validation platform can provide the updated first dataset to the metadata generation model to generate the metadata schema. As an illustrative example, the process validation platform determines that the validation indicator specifies particular portions of the dataset that are problematic (e.g., incomplete, missing, or inaccurate). The process validation platform can correct such portions, thereby fixing the dataset and enabling metadata generation based on a more accurate dataset.

At operation 610, the process validation platform can provide the first dataset to a metadata generation model to generate a metadata schema. For example, in response to determining that the first dataset is valid, the process validation platform provides the first dataset to a metadata generation model to generate a metadata schema. The metadata schema can include a textual representation of a set of metadata corresponding to particular portions of the first dataset. As an illustrative example, the process validation platform generates a textual metadata schema that describes the organization, format, and/or structure of the input dataset. By determining such information, the process validation platform enables further generation of test cases (e.g., test datasets) based on a generalized description of the retrieved dataset, thereby improving the availability of test datasets.

In some implementations, the process validation platform can generate a textual description and identifier of a portion of the dataset as the metadata schema. For example, the process validation platform provides a portion of the first dataset to the metadata generation model to generate (1) a textual description of the portion of the first dataset and (2) an identifier of the portion of the first dataset. The process validation platform can generate a textual description of the first dataset including the textual description of the portion of the first dataset and the identifier of the portion of the first dataset. The process validation platform can generate the metadata schema including the textual description of the first dataset. To illustrate, the metadata schema can include descriptions of particular columns, rows, or fields within the dataset, as well as associated data types (e.g., variable types) and/or other specifications, requirements, or formats associated with the dataset.

At operation 612, the process validation platform can generate a metadata structure that represents the metadata schema. For example, the process validation platform generates, using a parsing algorithm, a metadata structure representing the metadata schema. The metadata structure can include delineator-separated metadata associated with the particular portions of the first dataset. As an illustrative example, the process validation platform generates a structured version of the metadata schema (e.g., using a predetermined format, such as comma-separated values and/or YAML Ain't Markup Language (YAML) formats). By doing so, the process validation platform prepares the metadata in an easily processable manner to aid in generation of test cases based on the metadata.

In some implementations, the process validation platform can generate the metadata structure by linking identifiers of particular portions of the dataset to associated descriptions of the metadata. For example, the process validation platform identifies, within the metadata schema, a first textual description of a portion of the first dataset. The process validation platform can determine, using the metadata schema, an identifier of the portion of the first dataset corresponding to the first textual description. The process validation platform can generate, within the metadata structure, the identifier of the portion of the first dataset as a first value associated with a first field of the metadata structure. The process validation platform can generate, within the metadata structure, the first textual description as a second value associated with a second field of the metadata structure (e.g., such that the first field and the second field are linked). As an illustrative example, the process validation platform generates a metadata structure with rows indicating identifiers of portions of the first dataset (e.g., identifiers of dataset columns), and values in a column indicating associated descriptions of such portions of the dataset. By doing so, the process validation platform enables the organization and structuring of metadata for the efficient and automated generation of test data for test cases for the data transformation pipeline.

At operation 614, the process validation platform can store the metadata structure can store the metadata structure within a database, such as a cloud storage database. As an illustrative example, the process validation platform stores the metadata structure in a location accessible by various devices of the data transformation pipeline, thereby enabling decentralized data processing and test case generation to improve system resilience, efficiency, and flexibility.

At operation 616, the process validation platform can retrieve the metadata structure to generate graphical representations of portions of the metadata structure. For example, the process validation platform retrieves the metadata structure remotely via the cloud storage database to generate graphical representations of the delineator-separated metadata associated with the particular portions of the first dataset for display on a user device. As an illustrative example, the process validation platform generates representations of the fields of the metadata structure within an HTML-type graphical user interface to enable interaction with administrator devices and/or other entities. By doing so, the process validation platform provides users with improved monitoring and control over generated metadata to aid in manual review and revision processes.

At operation 618, the process validation platform can receive an indication of a modification to a first graphical representation by an administrator device. For example, the process validation platform receives an indication of a modification to a first graphical representation of the graphical representations of the delineator-separated metadata. As an illustrative example, the process validation platform detects that a user has modified a field (e.g., a description or an identifier of a portion of the dataset) associated with the metadata structure within the HTML-based graphical user interface. By detecting such modifications and interactions, the process validation platform enables user control and intervention within test validation tasks, including test data creation and generation.

At operation 620, the process validation platform can generate a modified set of graphical representations of the metadata using the indication of the modification. For example, the process validation platform generates a modified set of graphical representations of the delineator-separated metadata using the indication of the modification. As an illustrative example, the process validation platform modifies the set of graphical representations of the metadata according to the modifications requested by the user, thereby enabling further revisions to the metadata according to the user's modifications.

In some implementations, the process validation platform updates a value of the representation of the metadata structure based on the indication of the modification. For example, the process validation platform determines that the indication of the modification includes an identifier of a first portion of the metadata structure and an updated value for the first portion of the metadata structure. The process validation platform can update the metadata structure to include the updated value in lieu of the first portion of the metadata structure. The process validation platform can generates the modified set of graphical representations including a representation of the updated metadata structure. As an illustrative example, the process validation platform updates particular values of the metadata according to an updated value provided by the user, thereby enabling storage of values substituted by the user within the generated metadata structures. By doing so, the process validation platform enables an interactive, flexible interface for changing, modifying, and/or reviewing metadata schemas.

In some implementations, the process validation platform can update the metadata structure according to the updated value. For example, the process validation platform generates an updated metadata structure based on the indication of the modification to the first graphical representation. The process validation platform can process the updated metadata structure using a metadata validation model to a data generation model to enable generation of a first code sample for testing data associated with the data transformation environment. As an illustrative example, the process validation platform can generate test data based on the generated metadata structure (e.g., such that the test data conforms to any requirements or formats specified within the metadata structure). By doing so, the process validation platform enables further generation of test cases and execution of validation tests associated with the data transformation environment disclosed herein.

Test Data Generation

Figure 7:
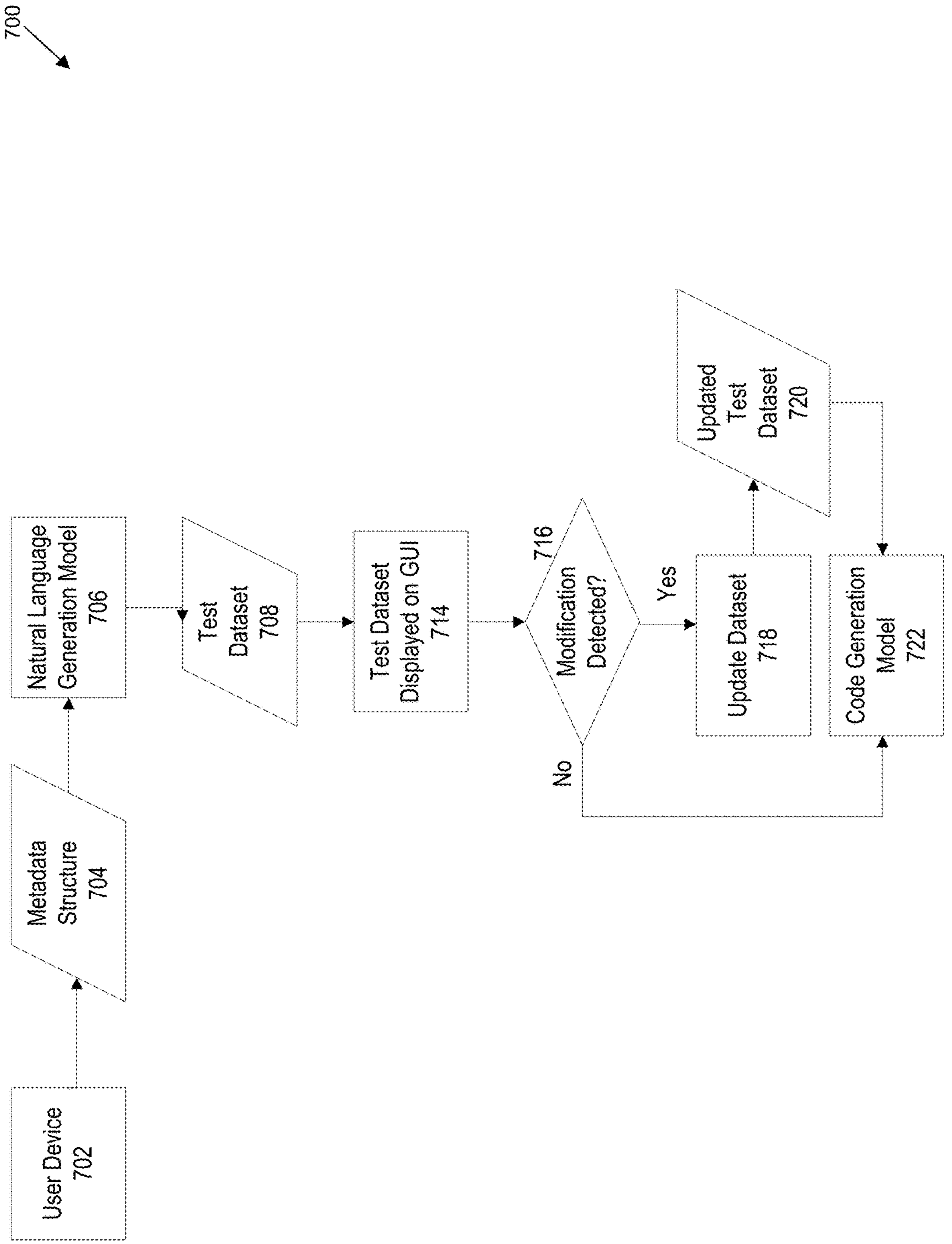
FIG. 7 is a schematic illustrating a flow for generating user-controlled data validation tests based on generated metadata structures.

FIG. 7 is a schematic illustrating a flow 700 for generating user-controlled data validation tests based on generated metadata structures. For example, the flow 700 enables the process validation platform to generate code based on simulated test data in order to enable the validation of the data transformation pipeline (e.g., associated with the data transformation environment 100).

To illustrate, the process validation platform receives a metadata structure from the user device 702 (e.g., one of the electronic devices 110-1 of FIG. 1). For example, a user device 702 can upload a data schema (e.g., a metadata schema) that includes column names and associated metadata associated with target datasets (e.g., to be generated as test cases within the data transformation pipeline). The user device 702 can upload the data schema using an API associated with an HTML-based graphical user interface to a cloud storage location and/or a single device. In some implementations, the process validation platform validates the metadata prior to proceeding (e.g., as described in relation to FIGS. 5 and 6).

In some implementations, the process validation platform provides the metadata structure 704 to a data generation model (e.g., a generative AI model, such as an LLM, as described in relation to FIG. 2). The data generation model enables generation of a test dataset based on metadata, as described in relation to FIGS. 3 and 4. As such, the data generation model enables generation of the test dataset 708 based on metadata created by and/or retrieved from entities associated with the data transformation pipeline. The test dataset 708 can be generated in a standardized format (e.g., a CSV and/or spreadsheet format) for storage on a cloud location and/or a network location associated with an electronic device to enable decentralized processing and validation of the generated test datasets.

At operation 714, the process validation platform can generate the test dataset for display on a graphical user interface (e.g., on an HTML-based interface). At operation 716, the process validation platform determines whether the user has modified and/or interacted with a graphical representation of the test dataset within the graphical user interface. For example, in response to determining that the user has interacted with the graphical user interface (e.g., via a user control associated with the HTML-based interface), the process validation platform can (e.g., at operation 716) determine an indication of a modification requested by the user (e.g., via the user control) and provide this indication and the test dataset to a dataset generation model to generate an updated test dataset 718 that satisfies the modification request by the user via the graphical user interface. The process validation platform can transmit the updated test dataset 718 to the data pipeline (e.g., at operation 722) for further generation of associated test data and/or associated code samples. In some implementations, the process validation platform determines that no modification has been detected and transmits the originally generated metadata structure to the data pipeline (e.g., at operation 716) accordingly.

Process for Implementing User-Controlled Automated Data Validation

Figure 8:
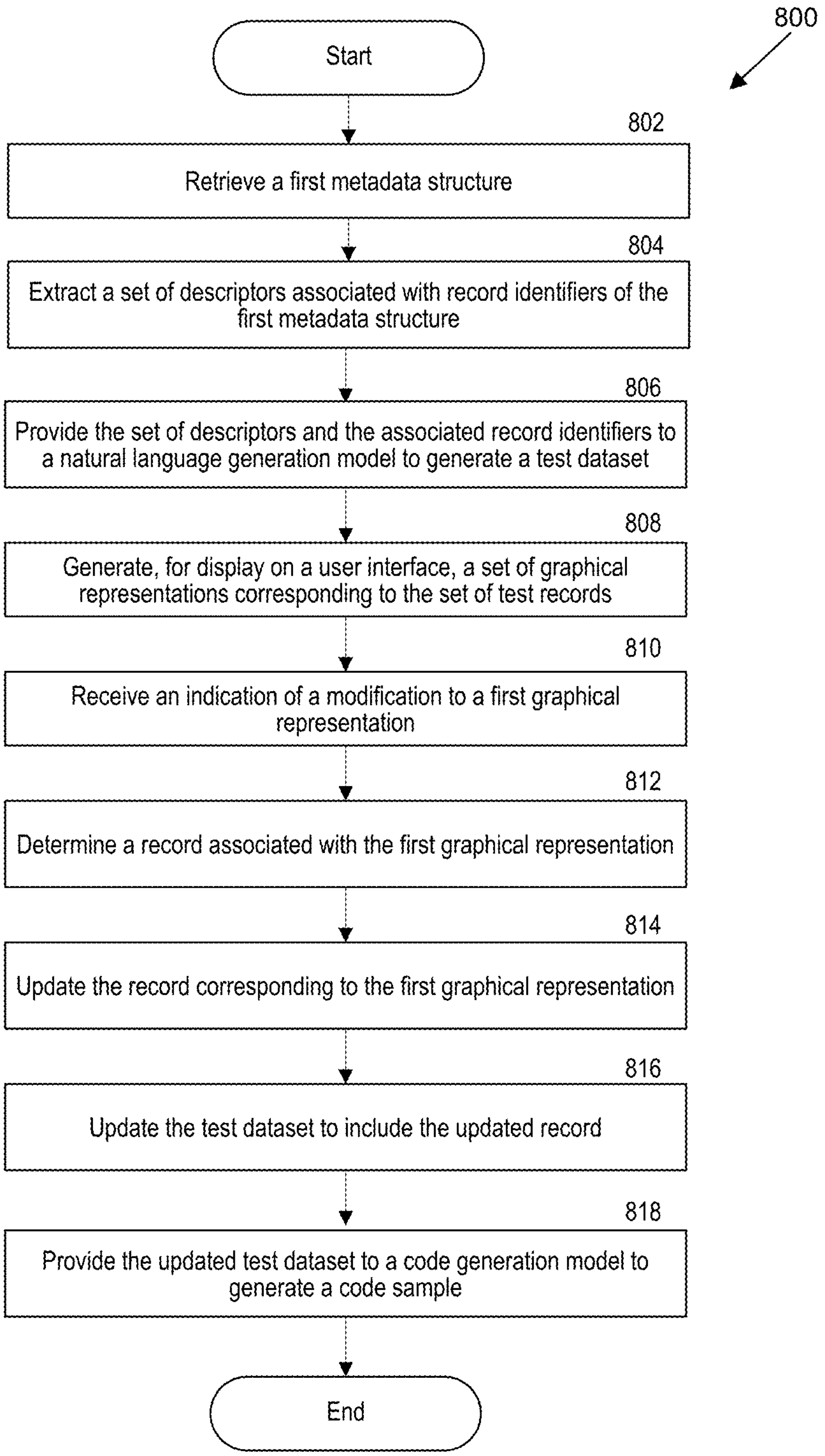
FIG. 8 is a flowchart illustrating a process for implementing user-controlled, automated data validation tests while enabling user intervention.

FIG. 8 is a flowchart illustrating a process 800 for implementing user-controlled, automated data validation tests while enabling user intervention. For example, the process 800 enables generation of simulated test datasets and associated test cases for testing a data transformation process (e.g., associated with a software development pipeline) based on metadata information in an automated manner, while enabling user supervision and control over test case generation.

At operation 802, the process validation platform can retrieve a first metadata structure. For example, the process validation platform retrieves a first metadata structure associated with a data transformation environment. The first metadata structure includes a first set of descriptors associated with record identifiers of the first metadata structure. As an illustrative example, the process validation platform retrieves metadata generated on the basis of pre-existing data associated with the data transformation pipeline (e.g., datasets that include sensitive or private information). By retrieving such metadata, the process validation platform enables the automated generation of test cases for testing the accuracy, efficiency, and/or performance characteristics of the data transformation environment, thereby improving the availability of test cases, while preserving the security and sensitivity of associated data.

At operation 804, the process validation platform can extract descriptors associated with record identifiers of the metadata structure. For example, the process validation platform extracts a set of descriptors associated with record identifiers of the first metadata structure. As an illustrative example, the process validation platform can determine descriptors that correspond to specifications of particular values or columns (e.g., as identified by the record identifier) within a metadata schema. For example, a descriptor can include a description of a value (e.g., including an associated variable type) associated with a particular column of a dataset associated with such a metadata structure. By doing so, the process validation platform enables dynamic generation of data of the data transformation pipeline.

At operation 806, the process validation platform can generate a test dataset based on the descriptors and record identifiers of the metadata structure. For example, the process validation platform provides the set of descriptors and the associated record identifiers to a natural language generation model to generate a test dataset, such that each record of the test dataset is consistent with a corresponding descriptor of the set of descriptors. As an illustrative example, the process validation platform generates a textual representation of a test dataset that includes rows of simulated data (e.g., each of which corresponding to a simulated record), where the columns include values of data that are consistent with the descriptors described within the metadata structure. As such, the process validation platform enables generation of data that is consistent with the specifications, requirements, and formats specified within the metadata structure.

In some implementations, the process validation platform can generate the test dataset by providing the descriptors and record identifiers to a natural language generation model (e.g., a data generation model) and generate a data structure that specifies relationships between values and fields. For example, the process validation platform provides the set of descriptors and the associated record identifiers to the natural language generation model to generate a set of values and an associated set of fields. The process validation platform can generate a data structure including the set of values and the associated set of fields. The data structure can include links between each value of the set of values and a corresponding field of the associated set of fields. As an illustrative example, the process validation platform can generate the data structure by generating a CSV where each row corresponds to a particular record, such that the columns (each representing a different field) are linked to each other to form the set of records.

In some implementations, the process validation platform generates the values and fields of the dataset by storing a relationship between such values. For example, the process validation platform determines a first field associated with the set of descriptors, where the first field is associated with a user identifier, an address, a user account value, or a demographic metric. The process validation platform can determine, using the set of descriptors, a first value corresponding to the first field. The process validation platform can store the first value and the first field within the data structure for the test dataset. As an illustrative example, the process validation platform generates the data associated with fields of the data based on associated descriptors of the metadata structure, thereby enabling generation of data structures that are consistent with the corresponding metadata.

At operation 808, the process validation platform can generate a set of graphical representations that enable a user to view, modify, and/or interact with the generated test records. For example, the process validation platform generates, for display on a user interface, a set of graphical representations corresponding to the test dataset. As an illustrative example, the process validation platform enables generation of representations (e.g., icons) associated with data within the test dataset, thereby enabling user monitoring, oversight, and review associated with generated data.

At operation 810, the process validation platform can receive an indication of a modification to an icon associated with a particular record of the test dataset. For example, the process validation platform receives an indication of a modification to a first graphical representation of the set of graphical representations. As an illustrative example, the process validation platform detects a modification executed by a user (e.g., of the user interface) requesting a change to data within the test dataset. For example, a user can detect the presence of sensitive or inappropriate information within the test dataset and modify the data using the graphical interface. Based on such a detection, the process validation platform enables user supervision of the generation of test data for testing the data transformation pipeline.

At operation 812, the process validation platform can determine a record associated with the graphical representation with which a user interacted. For example, the process validation platform determines a record associated with the first graphical representation of the set of graphical representations. As an illustrative example, the process validation platform identifies that the graphical representation modified by the user corresponds to an icon associated with a particular record of the test dataset (e.g., a particular user account of the simulated data). By identifying the record, the process validation platform enables further modification of the dataset according to the user's requested modification.

At operation 814, the process validation platform can update the record according to the requested modification. For example, in response to receiving the indication of a modification to the first graphical representation, the process validation platform updates the record corresponding to the first graphical representation of the set of graphical representations. As an illustrative example, the process validation platform enables modification of the portion of the dataset requested by the user according to the user's request, thereby enabling real-time direction by the user with respect to the creation and modification of simulated test data.

In some implementations, the process validation platform can update the record based on a modified value. For example, the process validation platform determines that the indication of the modification to the first graphical representation includes a modified value of the record associated with the first graphical representation. In response to determining that the indication of the modification includes the modified value, the process validation platform can update the record to include the modified value. The process validation platform can update the test dataset to include the updated record. As an illustrative example, the process validation platform detects that the user attempts to modify a particular value associated with a record of the test dataset via the graphical user interface. In response to such a detection, the process validation platform enables replacement of the original value associated with the record with the modified value, thereby enabling dynamic, user-supervised changes and modifications to test data.

In some implementations, the process validation platform can update the graphical representation based on the updated record. As an illustrative example, the process validation platform generates an updated first graphical representation based on the updated record. The process validation platform can update the set of graphical representations including the updated first graphical representation. The process validation platform can generate, for display on the user interface, the modified set of graphical representations. As an illustrative example, the process validation platform can reflect any changes to the record (e.g., of the test dataset) on the graphical user interface for confirmation to the associated user, thereby enabling dynamic, real-time interactivity between the user and the generated test data.

At operation 816, the process validation platform can update the test dataset according to the updated record. For example, the process validation platform updates the test dataset to include the updated record corresponding to the first graphical representation of the set of graphical representations. As an illustrative example, the process validation platform can update the test dataset according to the updated record associated with the modification. By doing so, the process validation platform enables user control of portions of the test dataset via the graphical user interface, thereby conferring improved control of the data validation process to administrators and/or other suitable entities.

At operation 818, the process validation platform can provide the updated test dataset to a code generation model to generate a code sample for testing the data transformation pipeline. For example, the process validation platform provides the updated test dataset to a code generation model to generate a code sample that enables dynamic testing of the data transformation environment using the updated test record. As an illustrative example, the process validation platform generates a code sample using the test dataset for further testing of the data transformation pipeline using simulated data, thereby enabling scalable, modular generation of test cases.

In some implementations, the process validation platform provides a scripting framework identifier and a test dataset to the code generation model to generate the code sample. For example, the process validation platform receives, from a user device, a scripting framework identifier. The process validation platform can provide the updated test dataset and the scripting framework identifier to the code generation model to cause the code generation model to generate a code sample. The code sample can be consistent with a scripting framework associated with the scripting framework identifier. As an illustrative example, the process validation platform provides an identifier of a scripting language for the validation test, as well as the test dataset, to the code generation model to generate the code sample, such that the validation test is in an executable and/or compilable format for the data transformation pipeline.

In some implementations, the process validation platform transmits the code sample to a device associated with the data transformation environment to enable testing and validation of data transformation operations for the associated pipeline. For example, the process validation platform transmits the code sample to the data transformation environment to enable dynamic testing of the data transformation environment using test records. As an illustrative example, the process validation platform can transmit the code sample to the data transformation environment to enable execution of the associated data validation test.

Code Generation and Evaluation

Figure 9:
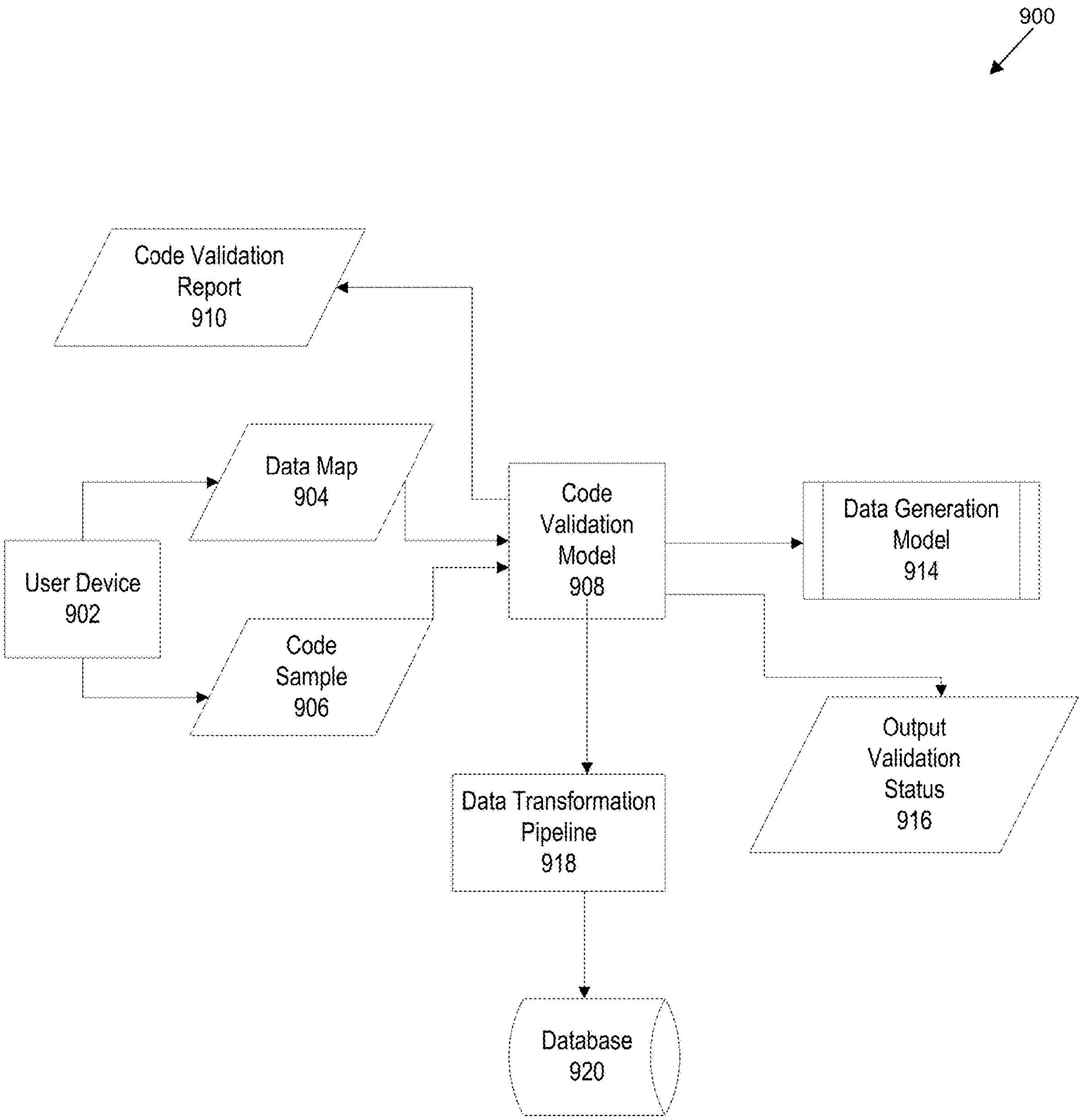
FIG. 9 is a schematic illustrating a flow for evaluating code samples for data validation tests.

FIG. 9 is a schematic illustrating a flow for evaluating code samples for data validation tests. For example, the flow 900 enables generation of code samples for validating data flows within the data transformation pipeline associated with the data transformation environment 100.

The process validation platform can receive a data map 904 and/or a code sample 906 (e.g., from a user device 902). The data map 904 can include a data model that includes information relating to the structure, relationships, and constraints of data being processed. For example, the data map 904 includes a data model with information relating to relationships between fields in transformed and untransformed data of the data transformation pipeline. By generating retrieving such information relating to the data pipeline, the process validation platform enables the evaluation of data analysis processes associated with the data pipeline by providing information relating to relationships between data (e.g., transformed and untransformed data) within the pipeline.

The code sample 906 can include code snippets associated with the data transformation platform. Additionally or alternatively, the code sample 906 includes code snippets or samples associated with data validation tasks (e.g., data validation tests and/or stopgaps). The code sample 906 can include code relating to an algorithm associated with a particular data validation task (e.g., validation of a name and/or value associated with a dataset of the data transformation pipeline). The code sample 906 can include algorithms and/or processes as expressed in a programming language (e.g., a scripting framework). A scripting framework can include a method, framework (e.g., set of rules), and/or standard for expressing an algorithm, code, and/or other suitable processes. A scripting framework can include a programming language, a markup language, and/or other similar frameworks or standards. By enabling the processing and evaluation of code samples using an LLM, the process validation platform enables flexible, resilient processing and evaluation of code associated with the data transformation pipeline, where such code samples arise from different sources and/or are associated with different applications.

The process validation platform can provide the data map 904 and the code sample 906 to a code validation model 908 to generate a code validation report 910 that includes an evaluation of the code. The code validation model 908 can include an LLM and/or another artificial intelligence model (e.g., as described in relation to FIG. 2). The code validation model 908 can accept data maps and/or code samples as input to enable dynamic evaluation and monitoring of code associated with the data transformation pipeline. For example, the code validation model 908 generates a code validation report 910 associated with the code sample 906 in light of the data map 904.

Figure 10:
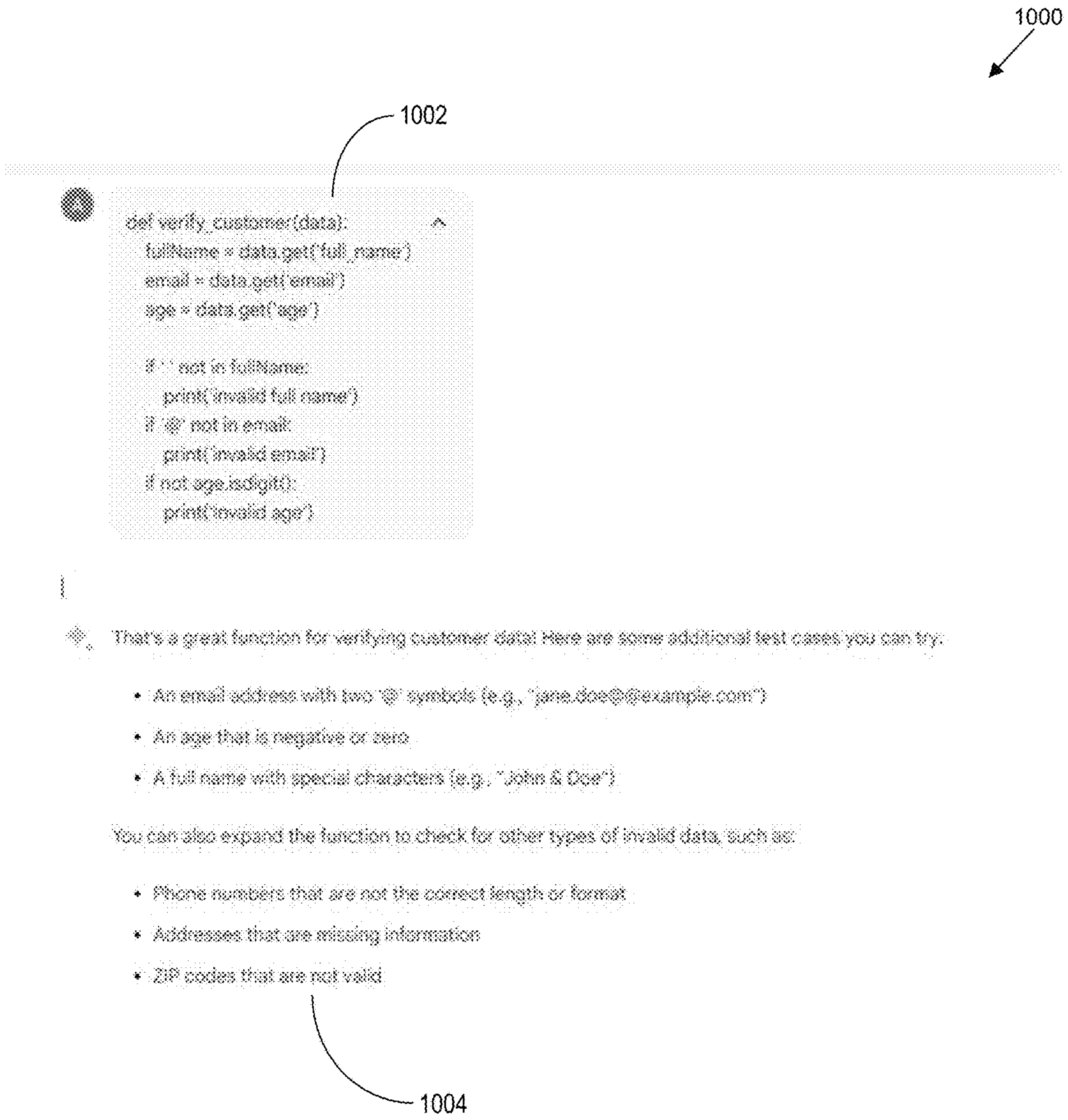
FIG. 10 is a schematic illustrating a code sample and an associated code validation report.

FIG. 10 is a schematic illustrating a code sample 1002 and an associated code validation report 1004. For example, the code validation report 1004 includes a textual summary of deficiencies and/or suggestions associated with the code sample 1002. The deficiencies can include an indication of errors, inconsistencies (e.g., with respect to format), ranges, and/or names associated with the code, as well as suggestions associated with generating test cases associated with testing the validity of the code. For example, the code validation report includes suggestions for expanding the code (e.g., by incorporating further elements and/or functions associated with the data transformation pipeline and associated datasets. The code validation model 908 can generate an indication of whether the function block logic associated with the code sample handles any required validation tasks for the function.

In some implementations, the code validation model generates additional data (e.g., test datasets) based on the code validation report. The process validation model can provide the data map 904 and/or the code sample 906, as well as the code validation report 910, to the data generation model 914 to generate further test datasets (e.g., as described in relation to FIGS. 3 and 7). For example, the code validation model generates test cases that include fields and values with inconsistencies, errors, and/or deficiencies (e.g., missing values, invalid data types, formatting errors, and/or outliers outside an expected range). By doing so, the code validation model 908 enables generation of test cases designed to improve the quality and effectiveness of generated validation tests associated with the data transformation pipeline.

The process validation platform can provide such test datasets and/or the associated code sample (e.g., as updated based on the code validation report) to the data transformation pipeline 918 (e.g., as associated with the data transformation environment 100) to generate outputs associated with the model and/or validation tests. An output can include an indication of a test result associated with a validation test within the data transformation pipeline. For example, the output includes an indication of a success or failure of the test dataset when processed using the data transformation pipeline 918. In some implementations, the output includes a particular value and/or object; the process validation platform can compare such a value with an associated expected value to determine an output validation status for the code sample and associated test data.

For example, the process validation platform generates an output validation status 916 associated with processing test datasets with the data transformation pipeline (e.g., using an output validation model, such as an LLM, as described in relation to FIG. 2). The output validation status can include information relating to a proportion of test data that includes an invalid output (e.g., an output/record entry in a target database) that is not equivalent to an expected output).

In some implementations, the process validation platform can train the code validation model to suggest improvements to the code samples based on the output validation status. For example, the process validation platform provides the output validation status and the associated code sample to the code validation model to train the code generation model to generate code validation reports based on associated input code samples. As such, the process validation platform enables improvements to data validation techniques within the data transformation pipeline based on the effectiveness of code samples within the pipeline, thereby improving the accuracy and effectiveness of such data validation tasks and processes in an automated manner.

Process for Generating, Evaluating, and Modifying Data Validation Tests

Figure 11:
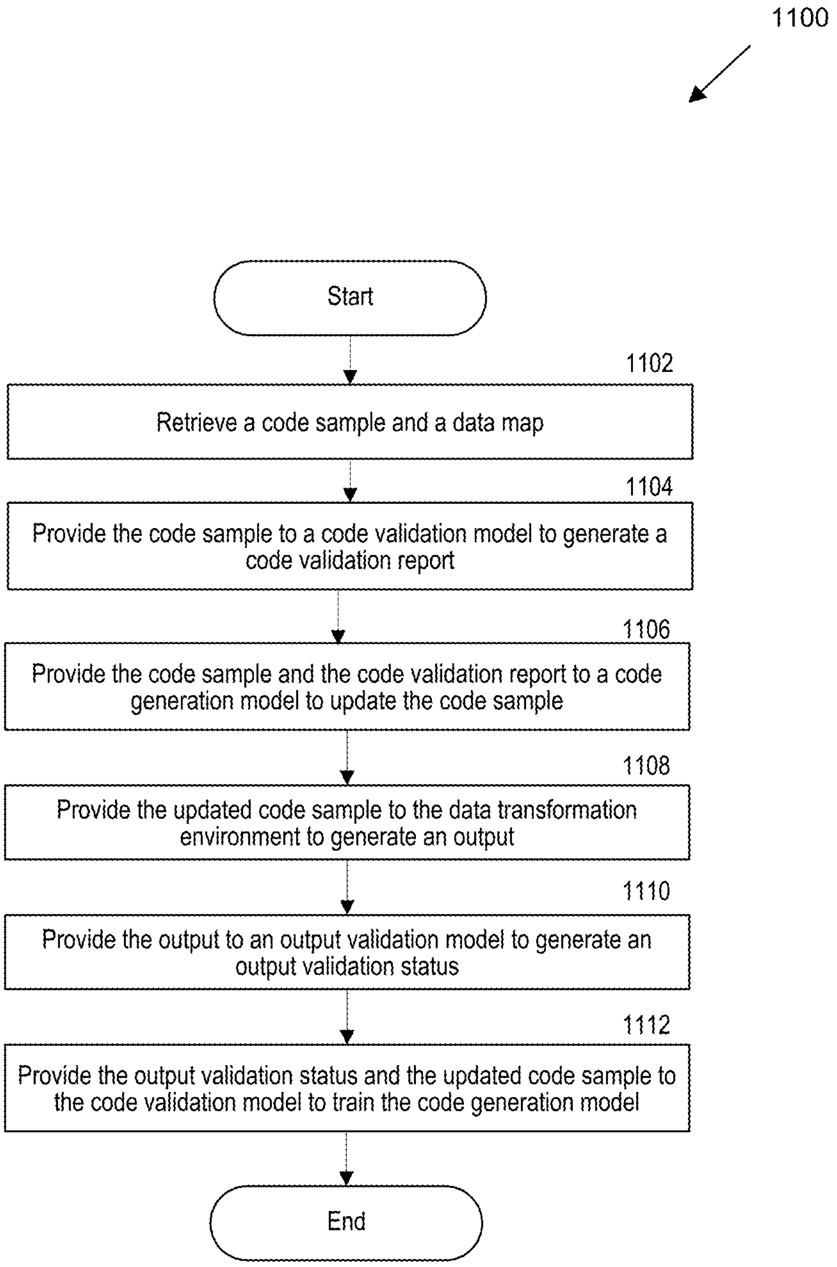
FIG. 11 is a schematic illustrating a process for generating, evaluating, and modifying data validation tests for a data transformation pipeline.

FIG. 11 is a schematic illustrating a process 1100 for generating, evaluating, and modifying data validation tests for a data transformation pipeline. For example, process 1100 enables the process validation platform to generate and evaluate algorithms or protocols for executing data validation tests for the data transformation pipeline based on the generation of simulated test data.

At operation 1102, the process validation platform can retrieve a code sample and a data map to enable validation of the code sample. For example, the process validation platform retrieves, from a first database, a code sample and a data map, wherein the data map includes indications of relationships between transformed and untransformed data within a data pipeline associated with a data transformation environment. As an illustrative example, the process validation platform retrieves a code sample (e.g., generated using process 400 or 800) and information relating to relationships between transformations and/or associated portions of datasets within the data transformation pipeline. Based on such information, the process validation platform can evaluate the operation of a particular data validation procedure based on expected behavior associated with the data transformation pipeline.

In some implementations, the process validation platform can generate the data map according to relationships between fields of transformed and untransformed data. For example, the process validation platform retrieves, from a database associated with the data transformation environment, a set of criteria, wherein each criterion of the set of criteria indicates a first target relationship between a first value associated with a first field of the transformed data and a second value associated with a second field of the untransformed data. The process validation platform can generate the data map including a representation of the first target relationship. As an illustrative example, the process validation platform can determine relationships between independent fields of datasets within the data transformation pipeline (e.g., at different stages of the pipeline and/or within the same dataset), thereby enabling validation of the functioning of the data pipeline.

At operation 1104, the process validation platform can provide the code sample to a code validation model to generate a code validation report that evaluates the validity and functioning of the code sample. For example, the process validation platform provides the code sample to a code validation model to generate a code validation report. The code validation report can include a textual summary of a validation status of the code sample. The textual summary can include instructions for modifying the code sample to be consistent with the data map. As an illustrative example, the process validation platform can generate a report that validates the effectiveness and/or consistency of the code sample generated by the process validation platform in light of expected relationships or requirements associated with data of the pipeline (e.g., according to the data map), thereby enabling validation of generated code.

In some implementations, the process validation platform generates a textual summary of deficiencies within the code sample as part of the code validation report. For example, the process validation platform provides the code sample to the code validation model to generate the textual summary, where the textual summary includes an indication of a deficiency in the code sample. The process validation platform can generate the code validation report including the indication of the deficiency in the code sample. As an illustrative example, the process validation system generates a summary that includes information relating to portions of the code sample that are to be improved, modified, or removed (e.g., according to suggestions generated by the code validation model). By doing so, the process validation system enables dynamic evaluation of generated validation tests, thereby improving the ability of the process validation system to detect errors in the data transformation pipeline.

At operation 1106, the process validation platform can provide the code sample and textual summary to the code generation model to update the code sample. For example, the process validation platform provides the code sample and the textual summary of the validation status to a code generation model to update the code sample based on the instructions for modifying the code sample. As an illustrative example, the process validation platform can provide the code sample and the indications of deficiencies in the code sample to a natural language generation model (e.g., an LLM) to generate a modified code sample that addresses the deficiencies identified. By doing so, the process validation platform enables dynamic, automated improvements to code samples for generating and validating data transformation processes.

In some implementations, the process validation platform can update the code sample based on an indication of an algorithm resolving a detected deficiency. For example, the process validation platform determines that the instructions for modifying the code sample include an indication of an algorithm resolving the deficiency. The process validation platform provides the indication of the algorithm and the code sample to the code generation model to update the code sample to include a code portion associated with the algorithm. As an illustrative example, the process validation platform generates, via the code validation model, an indication of a suggested algorithm for executing a particular validation function. By providing this indication to the code generation model, the process validation platform can incorporate the suggested algorithm within the updated code sample, thereby enabling dynamic improvements to validation test protocols.

At operation 1108, the process validation platform can provide the updated code sample to the data transformation environment to generate an output (e.g., indicative of the results of the validation test associated with the code sample). For example, the process validation platform provides the updated code sample to the data transformation environment to generate an output associated with the updated code sample. As an illustrative example, the process validation platform can provide the code sample, as well as associated test data, to the data transformation pipeline to validate the performance of such data within the data pipeline. For example, the process validation platform generates an output that indicates a proportion of the test data (and/or records within the test dataset) that has passed the validation test and/or rendered expected results. As such, the process validation platform enables dynamic evaluation of validation procedures and protocols (e.g., by measuring whether the validation procedures are able to capture/prevent the processing of faulty test data).

At operation 1110, the process validation platform can provide the output to an output validation model to generate an output validation status. For example, the process validation platform provides the output to an output validation model to generate an output validation status associated with the output. As an illustrative example, the process validation platform can determine whether the output indicates satisfactory functioning of the generated code sample and the associated validation test.

In some implementations, the process validation platform can generate test data that includes errors and/or other features to test particular aspects of the data transformation environment. For example, the process validation platform can provide the updated code sample to a data generation model to generate a test dataset. The test dataset can include values associated with one or more deficiencies. The process validation platform can provide the updated code sample and the test dataset to the data transformation environment to generate the output associated with the updated code sample. The process validation platform can provide the output to the output validation model to generate the output validation status associated with the output and the test dataset. As an illustrative example, the process validation platform can generate test data according to the code sample in a manner that tests particular aspects of the validation test. For example, the process validation platform generates data that includes inconsistencies, inaccuracies, and/or inconsistencies to test the effectiveness of the generated code sample.

At operation 1112, the process validation platform can provide the output to the code validation model to improve the accuracy of the code generation model. For example, the process validation platform provides the output validation status and the updated code sample to the code validation model to train the code generation model to generate code validation reports based on input code samples. As an illustrative example, the process validation platform can provide the results of the output validation to the code generation model to improve the ability of the code generation model to generate effective code samples for testing the data transformation pipeline.

In some implementations, the process validation platform can dynamically validate data associated with the data transformation pipeline based on dynamically received datasets. For example, the process validation platform receives a first dataset associated with the data transformation environment. The process validation platform can provide the updated code sample and the first dataset to the data transformation environment to generate a second output. The process validation platform can provide the second output to the output validation model to generate a second output validation status associated with the second output. The process validation platform can generate, for display on a user interface, the second output validation status. As an illustrative example, the process validation platform generates dynamically produced validation statuses to evaluate the effectiveness of code samples in detecting and/or preventing errors and inconsistencies.

In some implementations, the process validation platform can train the validation model to generate code validation reports, using the second validation status. For example, the process validation platform provides the second output validation status, the updated code sample, and the first dataset to the code validation model to train the code validation model to generate code validation reports based on input code samples. As an illustrative example, the process validation platform can train the validation model to improve validation (e.g., suggestions) associated with generating code samples based on the previous performance of generated code samples.

Computer System

Figure 12:
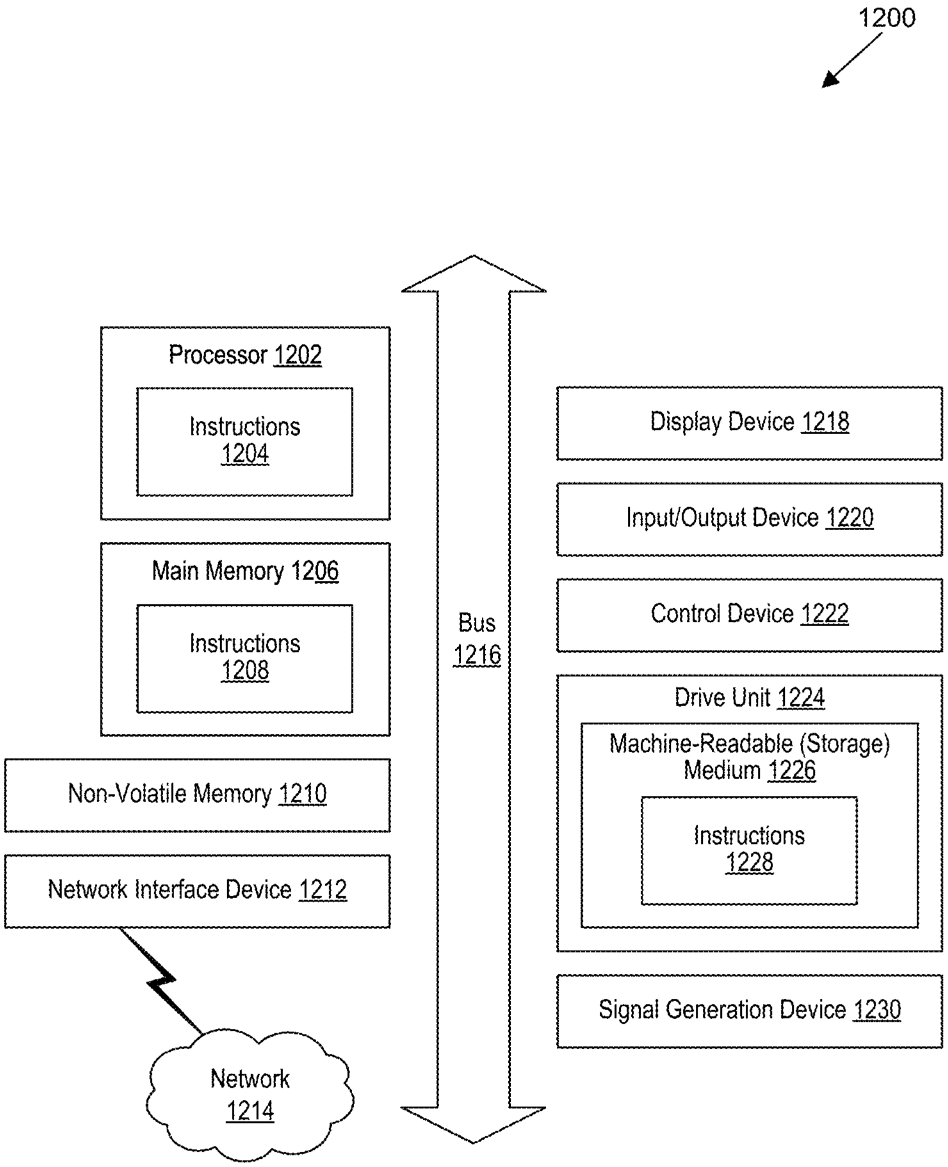
FIG. 12 is a block diagram that illustrates components of a computing device.

FIG. 12 is a block diagram that illustrates an example of a computer system 1200 in which at least some operations described herein can be implemented. As shown, the computer system 1200 can include: one or more processors 1202, main memory 1206, non-volatile memory 1210, a network interface device 1212, a video display device 1218, an input/output device 1220, a control device 1222 (e.g., keyboard and pointing device), a drive unit 1224 that includes a machine-readable (storage) medium 1226, and a signal generation device 1230 that are communicatively connected to a bus 1216. The bus 1216 represents one or more physical buses and/or point-to-point connections that are connected by appropriate bridges, adapters, or controllers. Various common components (e.g., cache memory) are omitted from FIG. 12 for brevity. Instead, the computer system 1200 is intended to illustrate a hardware device on which components illustrated or described relative to the examples of the figures and any other components described in this specification can be implemented.

The computer system 1200 can take any suitable physical form. For example, the computing system 1200 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1200. In some implementations, the computer system 1200 can be an embedded computer system, a system-on-chip (SOC), a single-board computer system (SBC), or a distributed system such as a mesh of computer systems, or it can include one or more cloud components in one or more networks. Where appropriate, one or more computer systems 1200 can perform operations in real time, in near real time, or in batch mode.

The network interface device 1212 enables the computing system 1200 to mediate data in a network 1214 with an entity that is external to the computing system 1200 through any communication protocol supported by the computing system 1200 and the external entity. Examples of the network interface device 1212 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1206, non-volatile memory 1210, machine-readable medium 1226) can be local, remote, or distributed. Although shown as a single medium, the machine-readable medium 1226 can include multiple media (e.g., a centralized/distributed database and/or associated caches and servers) that store one or more sets of instructions 1228. The machine-readable medium 1226 can include any medium that is capable of storing, encoding, or carrying a set of instructions for execution by the computing system 1200. The machine-readable medium 1226 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 1210, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1204, 1208, 1228) set at various times in various memory and storage devices in computing device(s). When read and executed by the processor 1202, the instruction(s) cause the computing system 1200 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A non-transitory, computer-readable storage medium comprising instructions recorded thereon, wherein the instructions, when executed by at least one processor of a system, cause the system to:

retrieve, from a first database, a first dataset associated with a data transformation environment;

provide the first dataset to a data validation model to generate a first validation indicator to validate the first dataset indicating whether the first dataset is valid;

in response to determining that the first dataset is valid, provide the first dataset to a metadata generation model to generate a metadata schema, wherein the metadata schema includes a textual representation of a set of metadata corresponding to particular portions of the first dataset;

generate, using a parsing algorithm, a metadata structure representing the metadata schema, wherein the metadata structure includes delineator-separated metadata associated with the particular portions of the first dataset;

store the metadata structure in a cloud storage database;

retrieve the metadata structure remotely via the cloud storage database to generate graphical representations of the delineator-separated metadata associated with the particular portions of the first dataset for display on a user device;

receive an indication of a user-based modification of a field within a first graphical representation of the graphical representations of the delineator-separated metadata, wherein the field is associated with the metadata structure, and wherein the user-based modification is by a user of the user device;

generate a user-modified set of graphical representations of the delineator-separated metadata using the indication of the user-based modification;

generate an updated metadata structure consistent with the user-based modification of the field within the first graphical representation;

input the updated metadata structure into a natural language generation model to generate a test dataset consistent with the updated metadata structure;

input the test dataset consistent with the updated metadata structure into a test generation model to generate a test record for the test dataset, wherein the test record includes parameters of a validation test, and wherein the test dataset used to generate the test record is generated according to requirements associated with the updated metadata structure consistent with the indication of the user-based modification;

input the test record into a code generation model to generate a code sample corresponding to the test dataset; and compile the generated code sample to enable execution of the validation test within a node associated with the data transformation environment, wherein the validation test uses the test dataset and is consistent with the user-based modification.

2. The non-transitory, computer-readable storage medium of claim 1, wherein the instructions for providing the first dataset to the data validation model cause the system to:

extract a first data record of the first dataset, wherein the first data record is associated with a first record identifier of the first dataset;

provide the first data record to the data validation model to generate an indication of an error associated with the first data record, wherein the indication of the error includes an identification of a deficiency associated with the first data record; and in response to generating the indication of an error, determine that the first validation indicator for the first dataset indicates that the first dataset is not valid.

3. The non-transitory, computer-readable storage medium of claim 2, wherein the instructions for generating the metadata schema cause the system to:

in response to determining that the first validation indicator for the first dataset indicates that the first dataset is not valid, update the first data record based on the identification of the deficiency;

update the first dataset to include the updated first data record associated with the first record identifier; and provide the updated first dataset to the metadata generation model to generate the metadata schema.

4. The non-transitory, computer-readable storage medium of claim 1, wherein the instructions for generating the metadata schema cause the system to:

provide a portion of the first dataset to the metadata generation model to generate (1) a textual description of the portion of the first dataset and (2) an identifier of the portion of the first dataset;

generate a textual description of the first dataset including the textual description of the portion of the first dataset and the identifier of the portion of the first dataset; and generate the metadata schema including the textual description of the first dataset.

5. The non-transitory, computer-readable storage medium of claim 1, wherein the instructions for generating the metadata structure cause the system to:

identify, within the metadata schema, a first textual description of a portion of the first dataset;

determine, using the metadata schema, an identifier of the portion of the first dataset corresponding to the first textual description;

generate, within the metadata structure, the identifier of the portion of the first dataset as a first value associated with a first field of the metadata structure; and generate, within the metadata structure, the first textual description as a second value associated with a second field of the metadata structure, wherein the first field and the second field are linked.

6. The non-transitory, computer-readable storage medium of claim 1, wherein the instructions for generating the user-modified set of graphical representations cause the system to:

determine that the indication of the user-based modification includes an identifier of a first portion of the metadata structure and an updated value for the first portion of the metadata structure;

update the metadata structure to include the updated value in lieu of the first portion of the metadata structure; and generate the user-modified set of graphical representations including a representation of the updated metadata structure.

7. The non-transitory, computer-readable storage medium of claim 1, wherein the instructions further cause the system to:

generate an updated metadata structure based on the indication of the user-based modification to the first graphical representation; and process the updated metadata structure using a metadata validation model to a data generation model to enable generation of a first code sample for testing data associated with the data transformation environment.

8. A system comprising:

at least one hardware processor; and at least one non-transitory memory storing instructions, which, when executed by the at least one hardware processor, cause the system to:

retrieve, from a first database, a first dataset associated with a data transformation environment;

provide the first dataset to a data validation model to generate a first validation indicator to validate the first dataset indicating whether the first dataset is valid;

in response to determining that the first dataset is valid, provide the first dataset to a metadata generation model to generate a metadata schema, wherein the metadata schema includes a textual representation of a set of metadata corresponding to particular portions of the first dataset;

generate, using a parsing algorithm, a metadata structure representing the metadata schema, wherein the metadata structure includes delineator-separated metadata associated with the particular portions of the first dataset;

store the metadata structure in a cloud storage database;

retrieve the metadata structure remotely via the cloud storage database to generate graphical representations of the delineator-separated metadata associated with the particular portions of the first dataset for display on a user device;

receive an indication of a user-based modification of a field within a first graphical representation of the graphical representations of the delineator-separated metadata, wherein the field is associated with the metadata structure, and wherein the user-based modification is by a user of the user device;

generate a user-modified set of graphical representations of the delineator-separated metadata using the indication of the user-based modification;

generate an updated metadata structure consistent with the user-based modification of the field within the first graphical representation;

input the updated metadata structure into a natural language generation model to generate a test dataset consistent with the updated metadata structure;

input the test dataset consistent with the updated metadata structure into a test generation model to generate a test record for the test dataset, wherein the test record includes parameters of a validation test, and wherein the test dataset used to generate the test record is generated according to requirements associated with the updated metadata structure consistent with the indication of the user-based modification;

input the test record into a code generation model to generate a code sample corresponding to the test dataset; and compile the generated code sample to enable execution of the validation test within a node associated with the data transformation environment, wherein the validation test uses the test dataset and is consistent with the user-based modification.

9. The system of claim 8, wherein the instructions for providing the first dataset to the data validation model cause the system to:

extract a first data record of the first dataset, wherein the first data record is associated with a first record identifier of the first dataset;

provide the first data record to the data validation model to generate an indication of an error associated with the first data record, wherein the indication of the error includes an identification of a deficiency associated with the first data record; and in response to generating the indication of an error, determine that the first validation indicator for the first dataset indicates that the first dataset is not valid.

10. The system of claim 9, wherein the instructions for generating the metadata schema cause the system to:

in response to determining that the first validation indicator for the first dataset indicates that the first dataset is not valid, update the first data record based on the identification of the deficiency;

update the first dataset to include the updated first data record associated with the first record identifier; and provide the updated first dataset to the metadata generation model to generate the metadata schema.

11. The system of claim 8, wherein the instructions for generating the metadata schema cause the system to:

provide a portion of the first dataset to the metadata generation model to generate (1) a textual description of the portion of the first dataset and (2) an identifier of the portion of the first dataset;

generate a textual description of the first dataset including the textual description of the portion of the first dataset and the identifier of the portion of the first dataset; and generate the metadata schema including the textual description of the first dataset.

12. The system of claim 8, wherein the instructions for generating the metadata structure cause the system to:

identify, within the metadata schema, a first textual description of a portion of the first dataset;

determine, using the metadata schema, an identifier of the portion of the first dataset corresponding to the first textual description;

generate, within the metadata structure, the identifier of the portion of the first dataset as a first value associated with a first field of the metadata structure; and generate, within the metadata structure, the first textual description as a second value associated with a second field of the metadata structure, wherein the first field and the second field are linked.

13. The system of claim 8, wherein the instructions for generating the user-modified set of graphical representations cause the system to:

determine that the indication of the user-based modification includes an identifier of a first portion of the metadata structure and an updated value for the first portion of the metadata structure;

update the metadata structure to include the updated value in lieu of the first portion of the metadata structure; and generate the user-modified set of graphical representations including a representation of the updated metadata structure.

14. The system of claim 8, wherein the instructions further cause the system to:

generate an updated metadata structure based on the indication of the user-based modification to the first graphical representation; and process the updated metadata structure using a metadata validation model to a data generation model to enable generation of a first code sample for testing data associated with the data transformation environment.

15. A method comprising:

retrieving, from a first database, a first dataset associated with a data transformation environment;

providing the first dataset to a data validation model to generate a first validation indicator to validate the first dataset indicating whether the first dataset is valid;

in response to determining that the first dataset is valid, providing the first dataset to a metadata generation model to generate a metadata schema, wherein the metadata schema includes a textual representation of a set of metadata corresponding to particular portions of the first dataset;

generating, using a parsing algorithm, a metadata structure representing the metadata schema, wherein the metadata structure includes delineator-separated metadata associated with the particular portions of the first dataset;

storing the metadata structure in a cloud storage database;

retrieving the metadata structure remotely via the cloud storage database to generate graphical representations of the delineator-separated metadata associated with the particular portions of the first dataset for display on a user device;

receiving an indication of a user-based modification of a field within a first graphical representation of the graphical representations of the delineator-separated metadata, wherein the field is associated with the metadata structure, and wherein the user-based modification is by a user of the user device; and generating a user-modified set of graphical representations of the delineator-separated metadata using the indication of the user-based modification;

generate an updated metadata structure consistent with the user-based modification of the field within the first graphical representation;

input the updated metadata structure into a natural language generation model to generate a test dataset consistent with the updated metadata structure;

input the test dataset consistent with the updated metadata structure into a test generation model to generate a test record for the test dataset, wherein the test record includes parameters of a validation test, and wherein the test dataset used to generate the test record is generated according to requirements associated with the updated metadata structure consistent with the indication of the user-based modification;

input the test record into a code generation model to generate a code sample corresponding to the test dataset; and compile the generated code sample to enable execution of the validation test within a node associated with the data transformation environment, wherein the validation test uses the test dataset and is consistent with the user-based modification.

16. The method of claim 15, wherein providing the first dataset to the data validation model comprises:

extracting a first data record of the first dataset, wherein the first data record is associated with a first record identifier of the first dataset;

providing the first data record to the data validation model to generate an indication of an error associated with the first data record, wherein the indication of the error includes an identification of a deficiency associated with the first data record; and in response to generating the indication of an error, determining that the first validation indicator for the first dataset indicates that the first dataset is not valid.

17. The method of claim 16, wherein generating the metadata schema comprises:

in response to determining that the first validation indicator for the first dataset indicates that the first dataset is not valid, updating the first data record based on the identification of the deficiency;

updating the first dataset to include the updated first data record associated with the first record identifier; and providing the updated first dataset to the metadata generation model to generate the metadata schema.

18. The method of claim 15, wherein generating the metadata schema comprises:

providing a portion of the first dataset to the metadata generation model to generate (1) a textual description of the portion of the first dataset and (2) an identifier of the portion of the first dataset;

generating a textual description of the first dataset including the textual description of the portion of the first dataset and the identifier of the portion of the first dataset; and generating the metadata schema including the textual description of the first dataset.

19. The method of claim 15, wherein generating the metadata structure comprises:

identifying, within the metadata schema, a first textual description of a portion of the first dataset;

determining, using the metadata schema, an identifier of the portion of the first dataset corresponding to the first textual description;

generating, within the metadata structure, the identifier of the portion of the first dataset as a first value associated with a first field of the metadata structure; and generating, within the metadata structure, the first textual description as a second value associated with a second field of the metadata structure, wherein the first field and the second field are linked.

20. The method of claim 15, wherein generating the user-modified set of graphical representations comprises:

determining that the indication of the user-based modification includes an identifier of a first portion of the metadata structure and an updated value for the first portion of the metadata structure;

updating the metadata structure to include the updated value in lieu of the first portion of the metadata structure; and generating the user-modified set of graphical representations including a representation of the updated metadata structure.

* * * * *